(12) United States Patent
Saito

(10) Patent No.: US 8,570,663 B2
(45) Date of Patent: Oct. 29, 2013

(54) ZOOM LENS AND IMAGE PICKUP APPARATUS EQUIPPED WITH THE ZOOM LENS

(75) Inventor: Shinichiro Saito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/588,907

(22) Filed: Aug. 17, 2012

(65) Prior Publication Data

US 2013/0050566 A1 Feb. 28, 2013

(30) Foreign Application Priority Data

Aug. 30, 2011 (JP) ................................ 2011-187165

(51) Int. Cl.
G02B 15/14 (2006.01)

(52) U.S. Cl.
USPC ........... 359/687; 359/683; 359/684; 359/685; 359/686; 359/715; 359/740; 359/774

(58) Field of Classification Search
USPC ........................ 359/683–687, 715, 740, 774
See application file for complete search history.

(56) References Cited

U.S. PATENT DOCUMENTS

| | | | | |
|---|---|---|---|---|
| 7,088,521 B2 * | 8/2006 | Hamano et al. | ............... | 359/686 |
| 7,551,366 B2 | 6/2009 | Suzaki | | |
| 7,580,202 B2 * | 8/2009 | Wada | ............. | 359/689 |
| 7,616,385 B2 * | 11/2009 | Hamano | ...................... | 359/683 |
| 7,864,456 B2 * | 1/2011 | Ishibashi | ...................... | 359/793 |
| 2008/0273249 A1* | 11/2008 | Hamano et al. | ............... | 359/687 |
| 2009/0310228 A1* | 12/2009 | Shinohara | ..................... | 359/687 |
| 2010/0302651 A1 | 12/2010 | Misaka | | |
| 2011/0002048 A1* | 1/2011 | Takano et al. | ................ | 359/687 |
| 2011/0176223 A1* | 7/2011 | Tashiro | ........................ | 359/683 |
| 2011/0181758 A1* | 7/2011 | Mihara | ...................... | 348/240.3 |

FOREIGN PATENT DOCUMENTS

JP 2011-28144 A 2/2011

* cited by examiner

*Primary Examiner* — Evelyn A. Lester
(74) *Attorney, Agent, or Firm* — Canon USA Inc IP Division

(57) ABSTRACT

A zoom lens includes a first lens unit of a positive refractive power, a second lens unit of a negative refractive power, a third lens unit of a positive refractive power, and a fourth lens unit of a positive refractive power, wherein the first lens unit does not move for zooming, at least the second and fourth lens units are moved during zooming, the first lens unit includes at least one positive lens, and an Abbe number and a relative partial dispersion of a material of the positive lens, an average refractive index of materials of negative lenses included in the second lens unit, a movement amount of the second lens unit for zooming from a wide-angle end to a telephoto end, a focal length of the second lens unit, and a focal length of the entire zoom lens at the telephoto end are appropriately set.

10 Claims, 34 Drawing Sheets

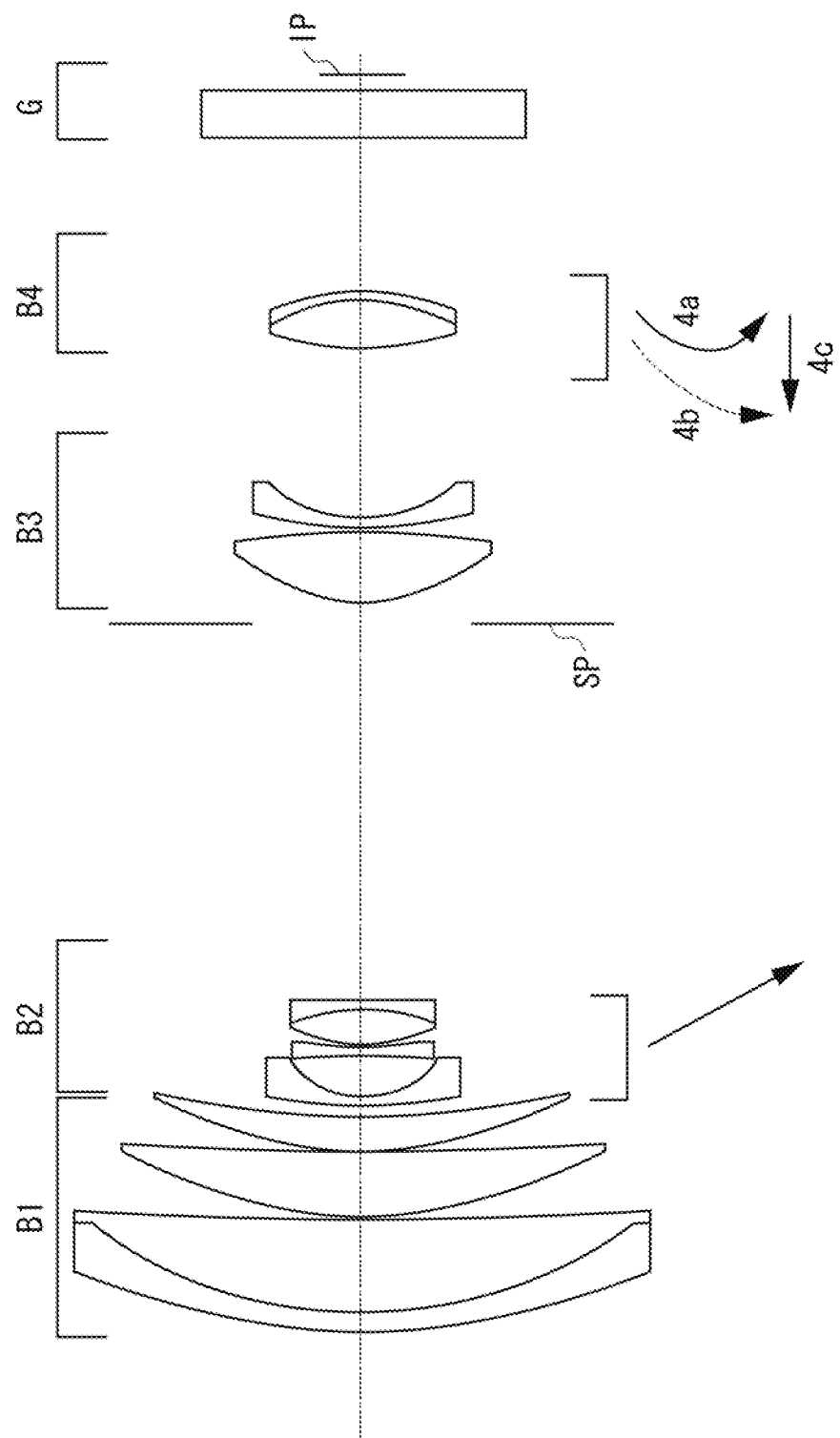

(FIRST MIDDLE)

(SECOND MIDDLE)

(TELEPHOTO END)

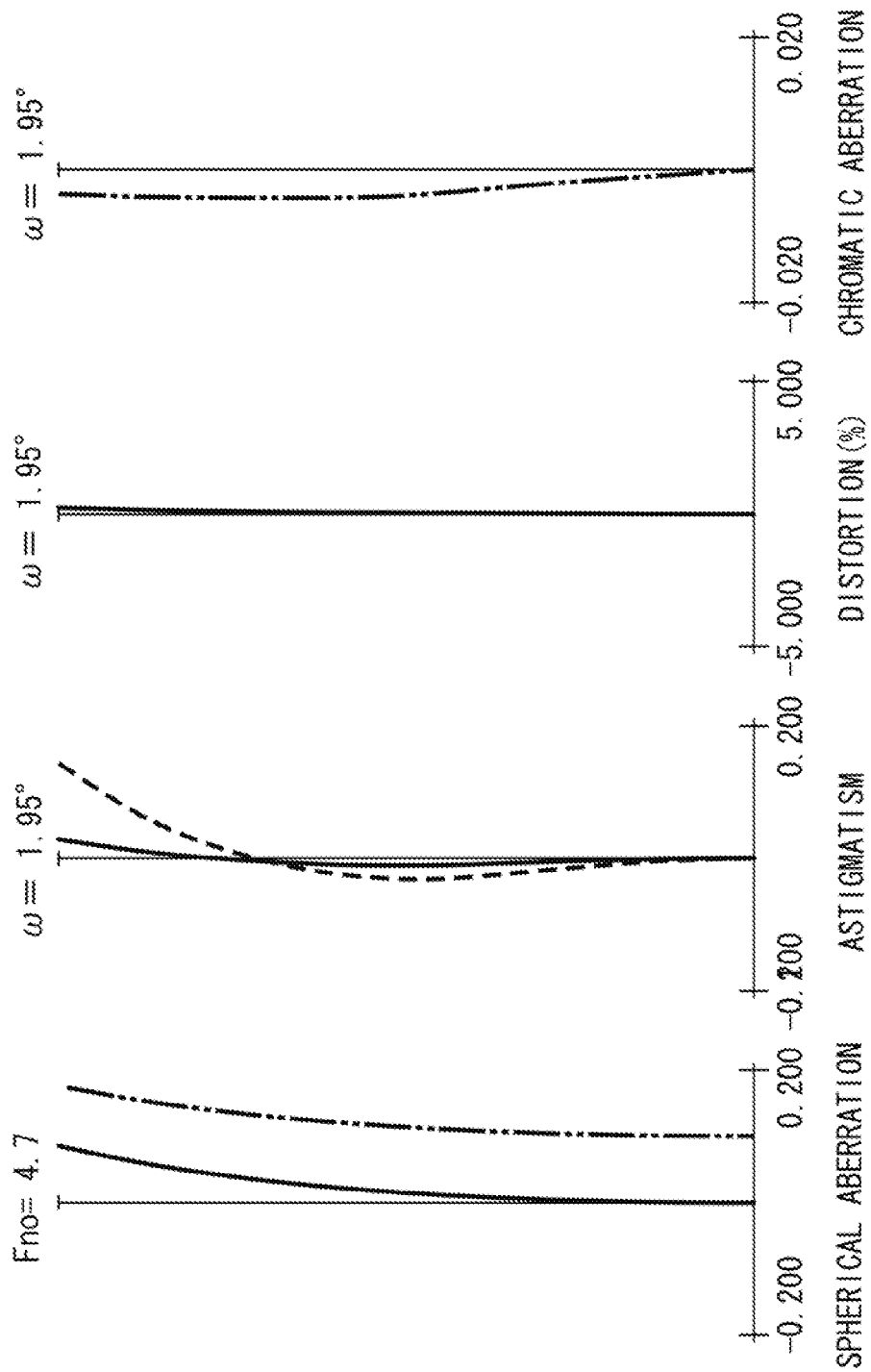

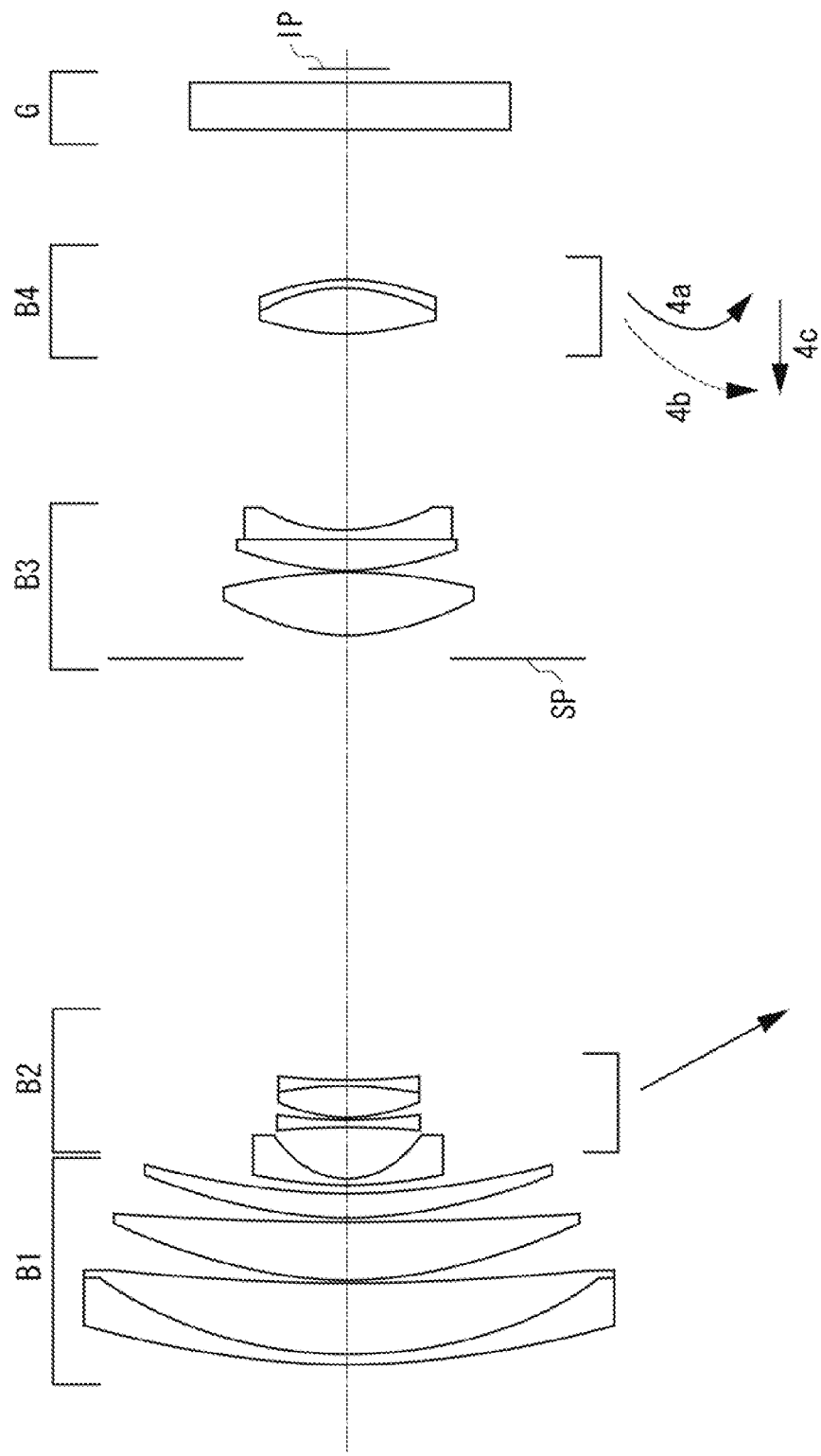
FIG. 3A (WIDE-ANGLE END)

(FIRST MIDDLE)

(SECOND MIDDLE)

(TELEPHOTO END)

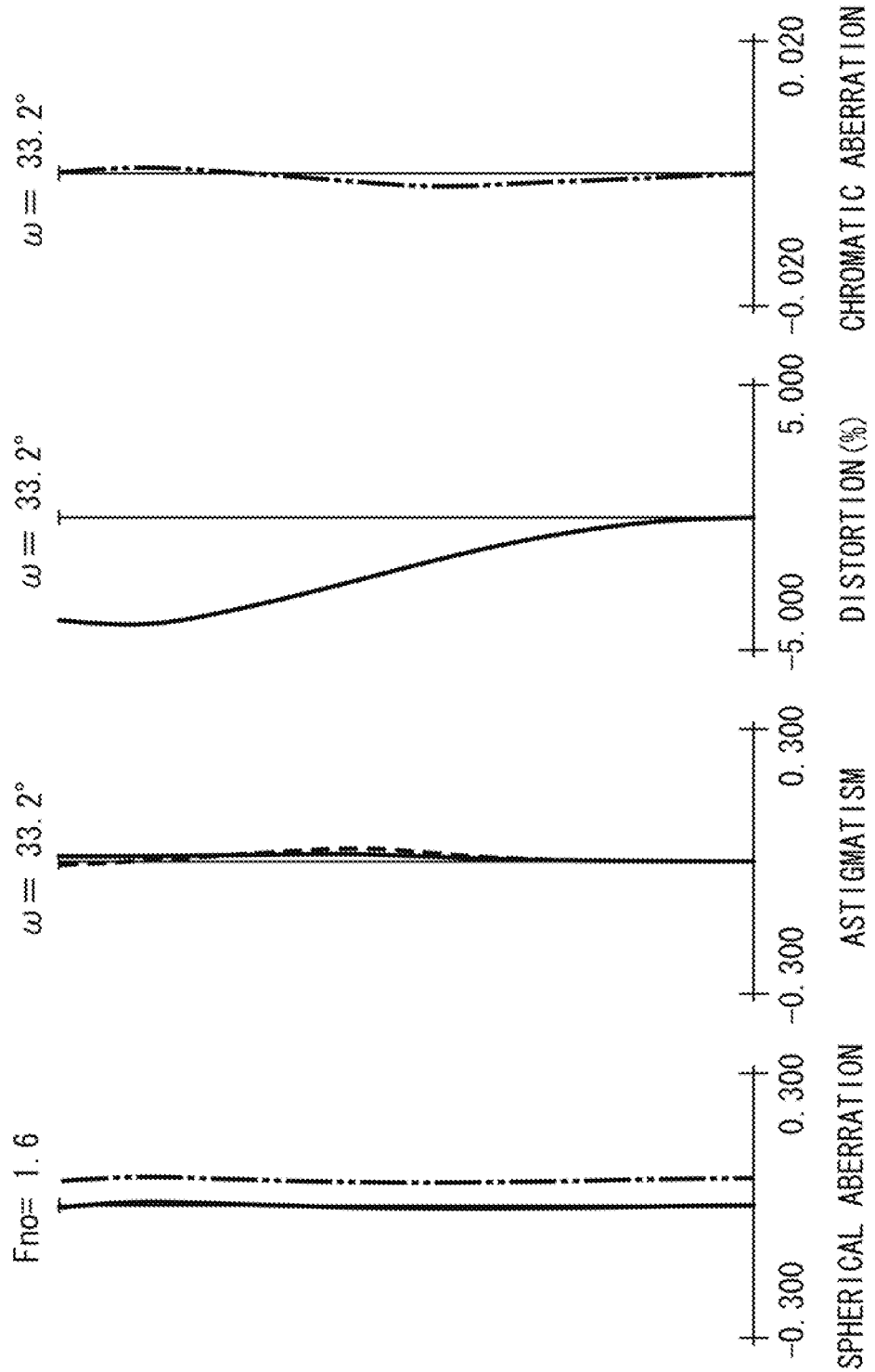

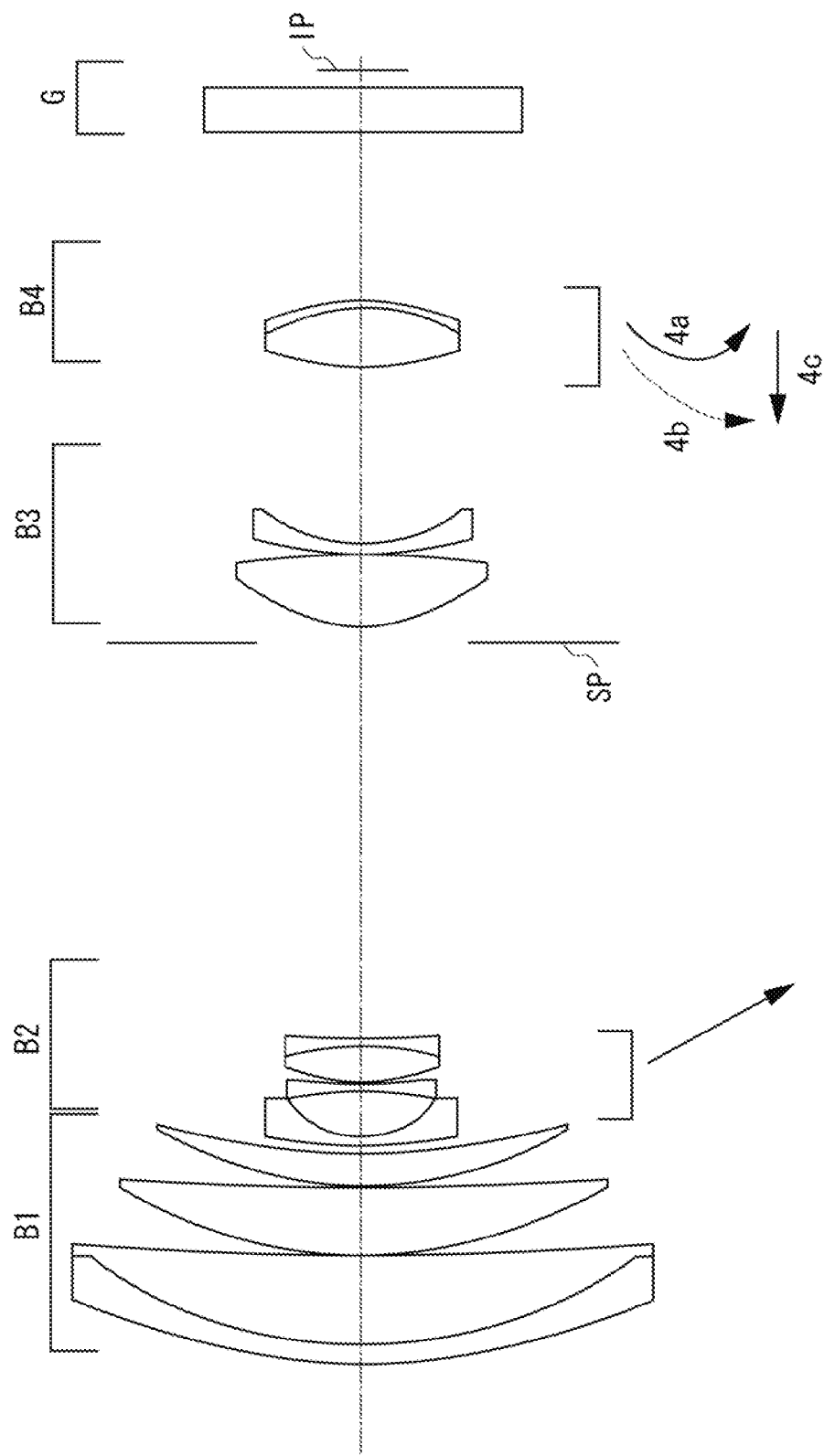

(FIRST MIDDLE)

(SECOND MIDDLE)

(TELEPHOTO END)

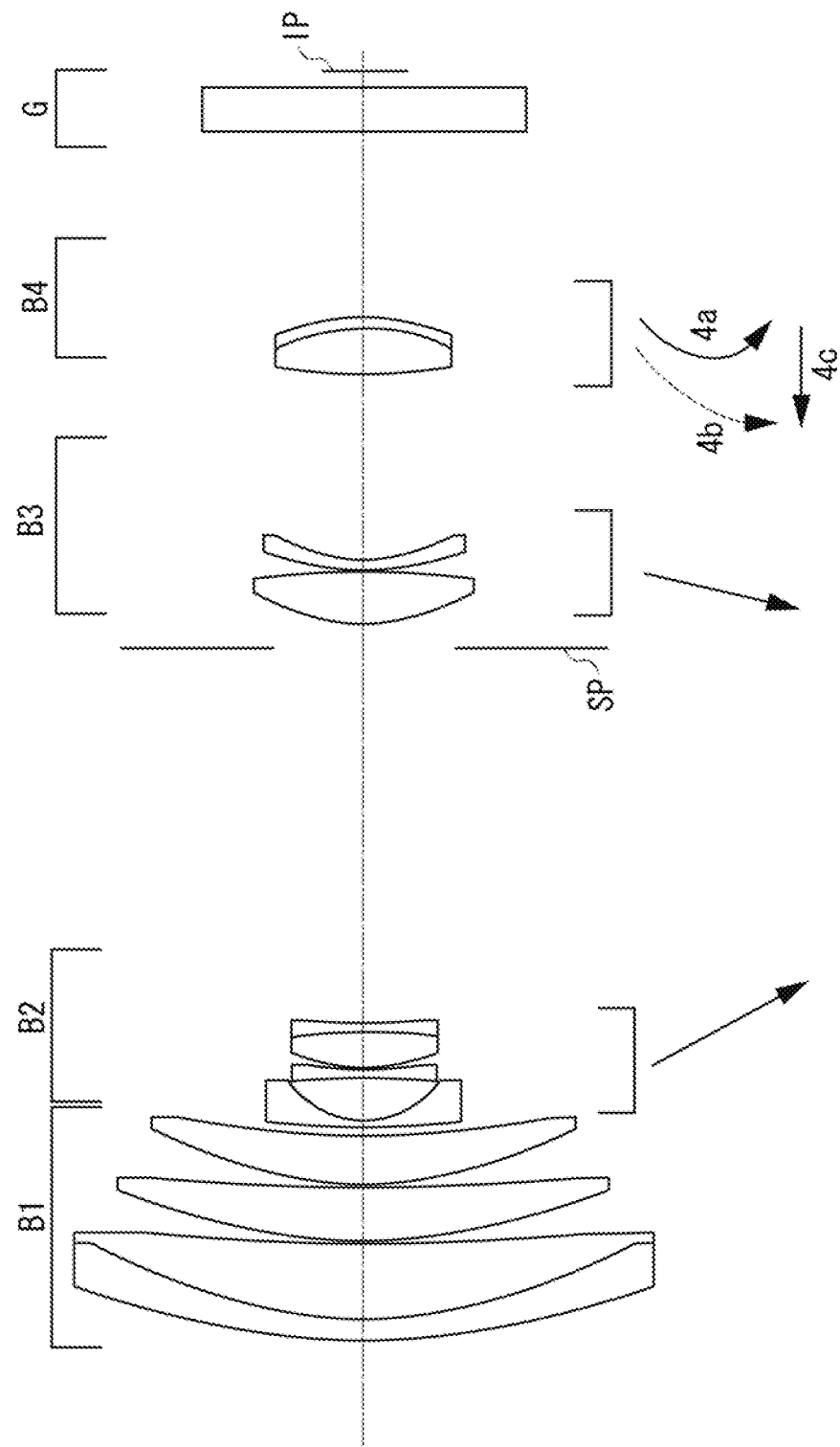

(FIRST MIDDLE)

(SECOND MIDDLE)

(TELEPHOTO END)

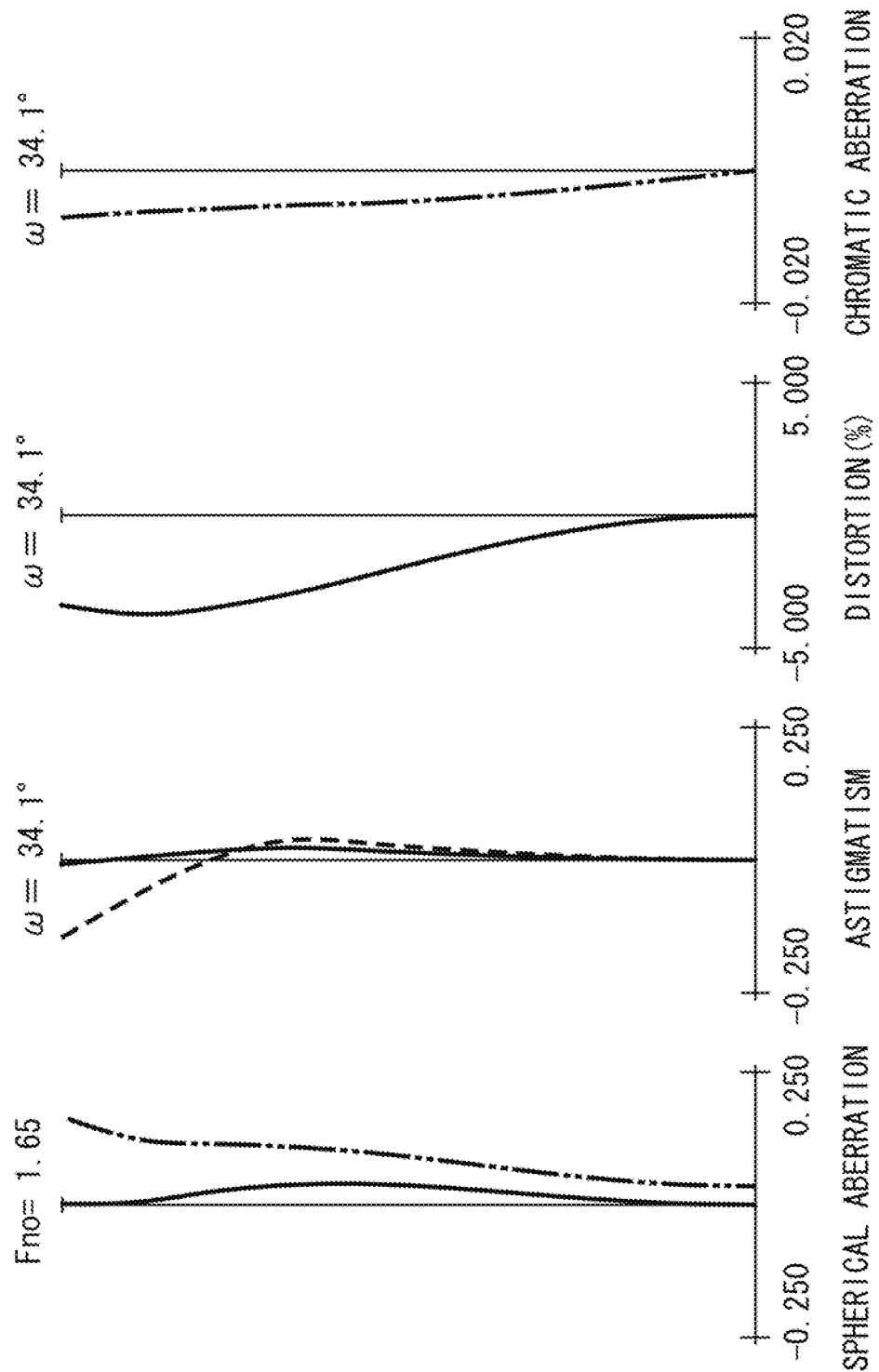

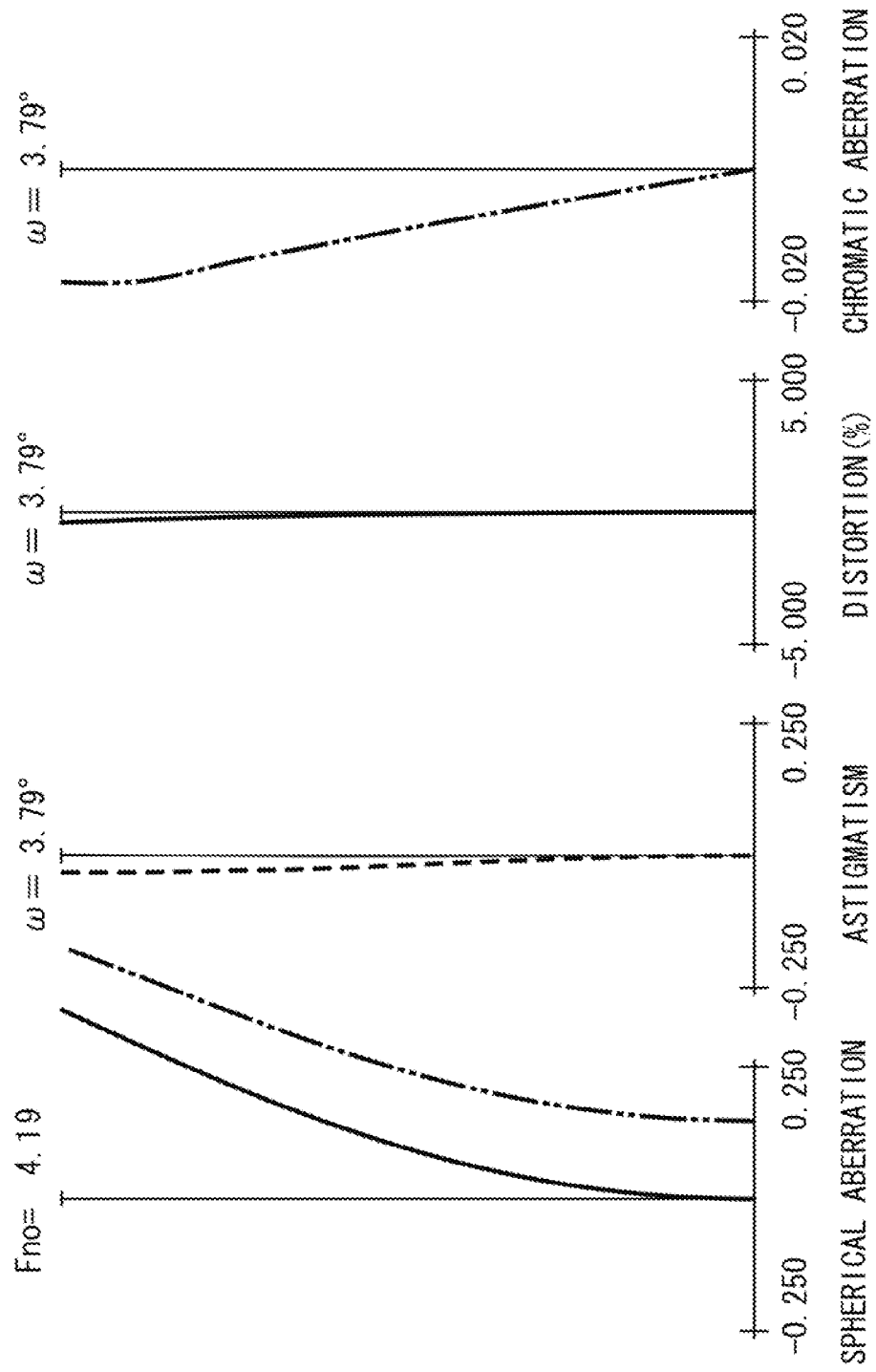

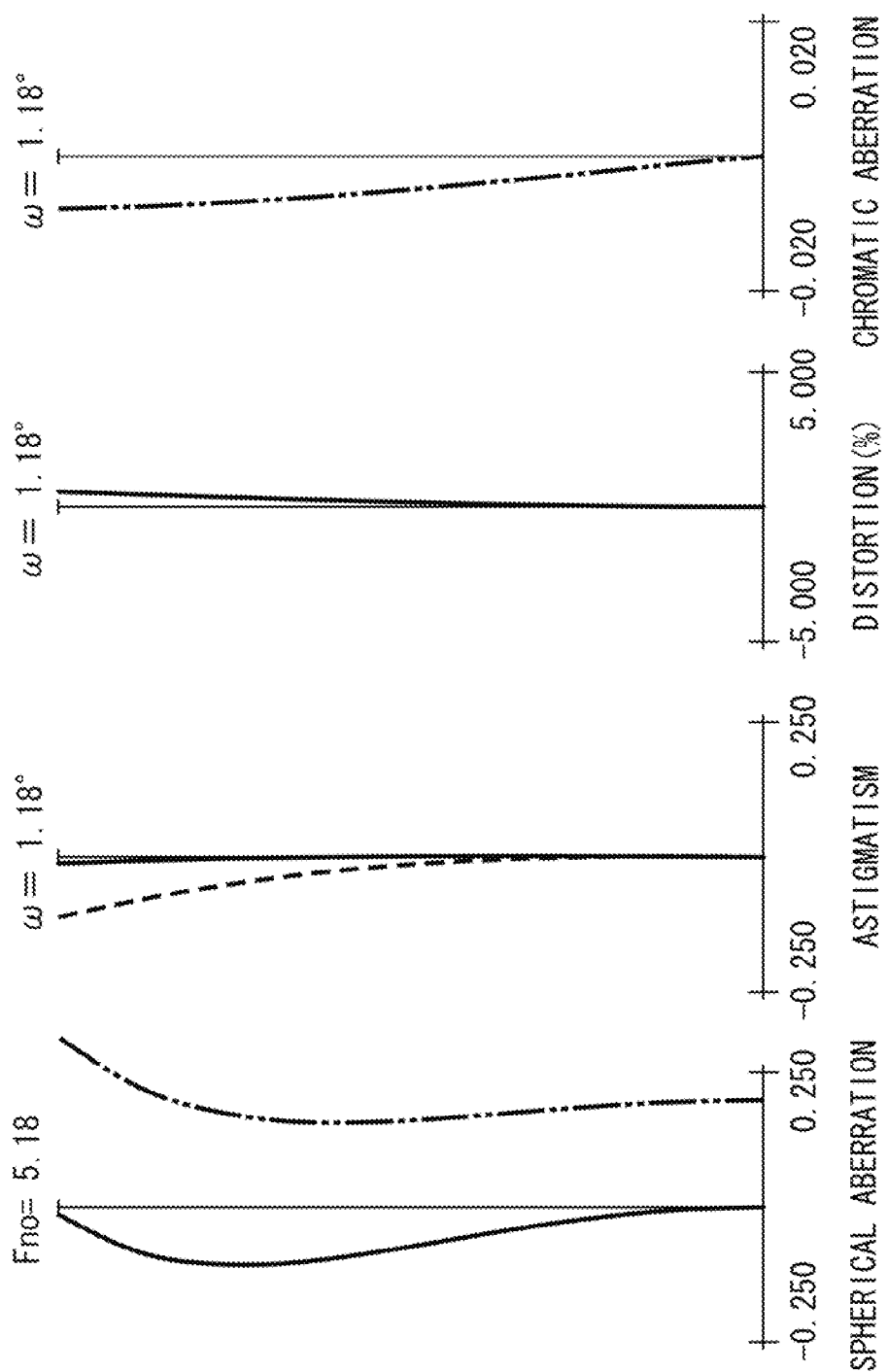

ZOOM LENS AND IMAGE PICKUP APPARATUS EQUIPPED WITH THE ZOOM LENS

BACKGROUND OF THE INVENTION

1. Field of the Invention

The present invention relates to a zoom lens and an image pickup apparatus equipped with the zoom lens, and more particularly, to a zoom lens suitable for a photographic optical system such as a still camera, a video camera, a digital still camera, a TV camera, and a monitoring camera.

2. Description of the Related Art

As an image pickup apparatus is miniaturized with a high functionality, there is a demand for a photographic lens used in the image pickup apparatus that is compact with a short lens length in entirety and provides a wide angle of view, a high zoom ratio, and a high resolution sufficient to appropriately correct chromatic aberration.

There is known a four-unit zoom lens including a first lens unit of a positive refractive power, a second lens unit of a negative refractive power, a third lens unit of a positive refractive power, and a fourth lens unit of a positive refractive power in order from an object side to an image side. In addition, there is also known a rear focus type four-unit zoom lens in which zooming is performed by moving the second lens unit, and the fourth lens unit corrects an image plane variation caused by zooming and performs focusing.

In general, the rear focus type zoom lens facilitates miniaturization of the entire zoom lens since the first lens unit has a smaller effective diameter in comparison with a zoom lens that performs focusing by moving the first lens unit. In addition, it facilitates near-distance imaging, particularly, when the imaging is performed at an extremely close range. Furthermore, since a lens unit having a small size and a light weight is moved, the lens unit can be moved with a small driving force, and focusing can be performed rapidly.

For example, U.S. Patent Application Publication No. 2010/0302651 and Japanese Patent Application Laid-open No. 2011-28144 discuss a miniaturized zoom lens including a first lens unit having a single negative lens and three positive lenses.

In order to obtain a predetermined zoom ratio and miniaturize the entire zoom lens, it is effective to increase the refractive power of each lens unit of the zoom lens and reduce the number of lenses. However, if the refractive power of each lens surface increase, the lens thickness increases. Accordingly, an effect of miniaturization of the lens system becomes insufficient, and various types of aberration are generated so that correction of such aberration is difficult.

In the positive lead type zoom lens, it is important to appropriately set each element of the zoom lens in order to miniaturize the entire zoom lens and obtain a high zoom ratio and high optical performance. For example, it is important to appropriately set the number of lens units, the refractive power of each lens unit, movement loci caused by zooming of each lens unit, zooming contributions of each lens unit, and the like.

In particular, in the positive lead type four-unit zoom lens, it is important to appropriately set each element of the first and second lens units. For example, it is important to appropriately set configurations such as materials of each lens of the first and second lens units, a refractive power (inverse of focal length) of the second lens unit for zooming, or a movement amount for zooming.

If such configurations are not appropriate, the size of the entire zoom lens increases to obtain a high zoom ratio. In addition, variations of various types of aberration caused by zooming, particularly, a variation of chromatic aberration increases, so that it is difficult to obtain excellent optical performance across the entire zoom range and the entire image plane.

SUMMARY OF THE INVENTION

The present invention is directed to a zoom lens and an image pickup apparatus equipped with the zoom lens, by which the entire zoom lens can be miniaturized, and excellent optical performance can be obtained across the entire zoom range from a wide-angle end to a telephoto end with a high zoom ratio.

According to an aspect of the present invention, a zoom lens includes, in order from an object side to an image side, a first lens unit of a positive refractive power, a second lens unit of a negative refractive power, a third lens unit of a positive refractive power, and a fourth lens unit of a positive refractive power, in which the first lens unit does not move for zooming, at least the second and fourth lens units are moved during zooming, the first lens unit includes at least one positive lens $1i$, and the following conditions are satisfied:

$$0.5826 < \theta gF1i + 0.001618 \times (vd1i - 36.23) < 0.8000,$$

$$0.040 < \sqrt{(|f2| \times m2)/ft} < 0.095, \text{ and}$$

$$1.90 < n2na < 2.50,$$

where $vd1i$ and $\theta gF1i$ denote an Abbe number and a relative partial dispersion, respectively, of a material of the positive lens $1i$, $n2na$ denotes an average refractive index of materials of negative lenses included in the second lens unit, $m2$ denotes a movement amount of the second lens unit for zooming from a wide-angle end to a telephoto end, $f2$ denotes a focal length of the second lens unit, and $ft$ denotes a focal length of the entire zoom lens at the telephoto end.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 1A, 1B, 1C, and 1D are lens cross-sectional views illustrating a zoom lens according to a first exemplary embodiment of the invention at a wide-angle end, a first middle zoom position, a second middle zoom position, and a telephoto end, respectively.

FIGS. 2A, 2B, 2C, and 2D are aberration diagrams of the zoom lens according to the first exemplary embodiment of the invention at the wide-angle end, the first middle zoom position, the second middle zoom position, and the telephoto end, respectively.

FIGS. 3A, 3B, 3C, and 3D are lens cross-sectional views illustrating a zoom lens according to a second exemplary embodiment of the invention at the wide-angle end, the first middle zoom position, the second middle zoom position, and the telephoto end, respectively.

FIGS. 4A, 4B, 4C, and 4D are aberration diagrams of the zoom lens according to the second exemplary embodiment of the invention at the wide-angle end, the first middle zoom position, the second middle zoom position, and the telephoto end, respectively.

FIGS. 5A, 5B, 5C, and 5D are lens cross-sectional views illustrating a zoom lens according to a third exemplary embodiment of the invention at the wide-angle end, the first middle zoom position, the second middle zoom position, and the telephoto end, respectively.

FIGS. 7A, 7B, 7C, and 7D are lens cross-sectional views illustrating a zoom lens according to a fourth exemplary embodiment of the invention at the wide-angle end, the first middle zoom position, the second middle zoom position, and the telephoto end, respectively.

FIGS. 8A, 8B, 8C, and 8D are aberration diagrams of the zoom lens according to the fourth exemplary embodiment of the invention at the wide-angle end, the first middle zoom position, the second middle zoom position, and the telephoto end, respectively.

DESCRIPTION OF THE EMBODIMENTS

Figure 1B:
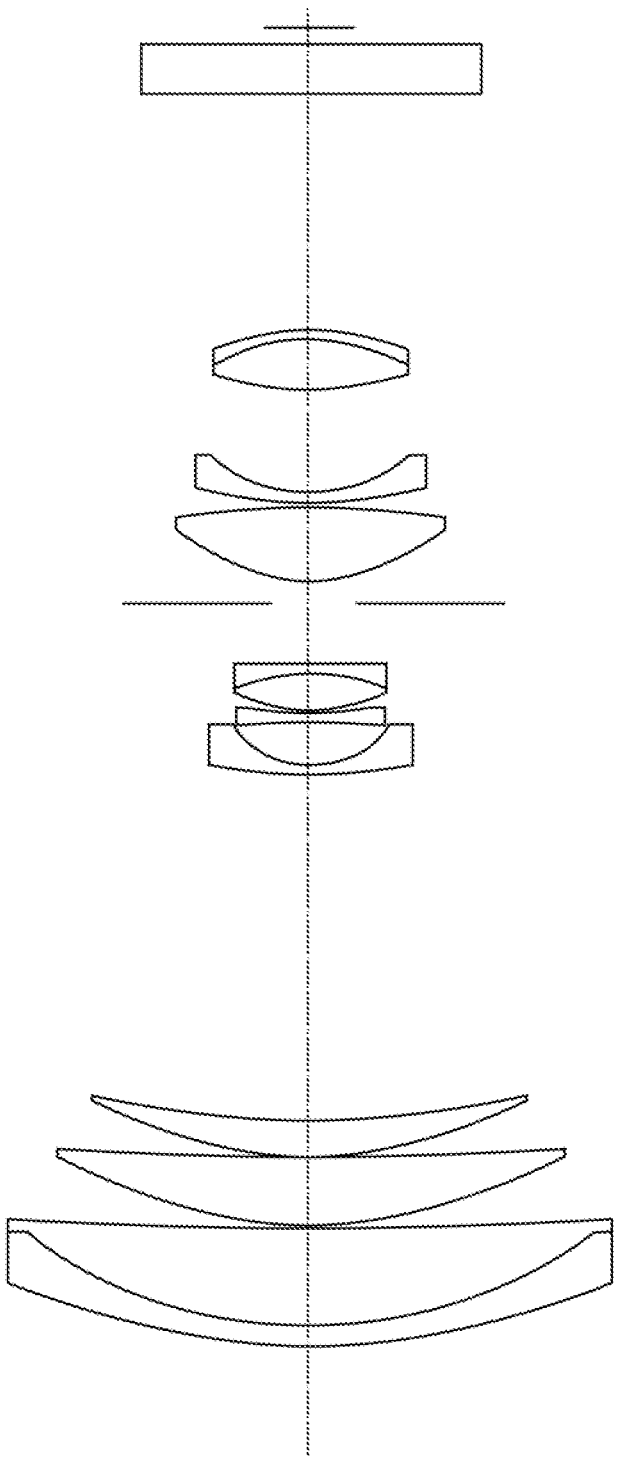
Figure 1C:
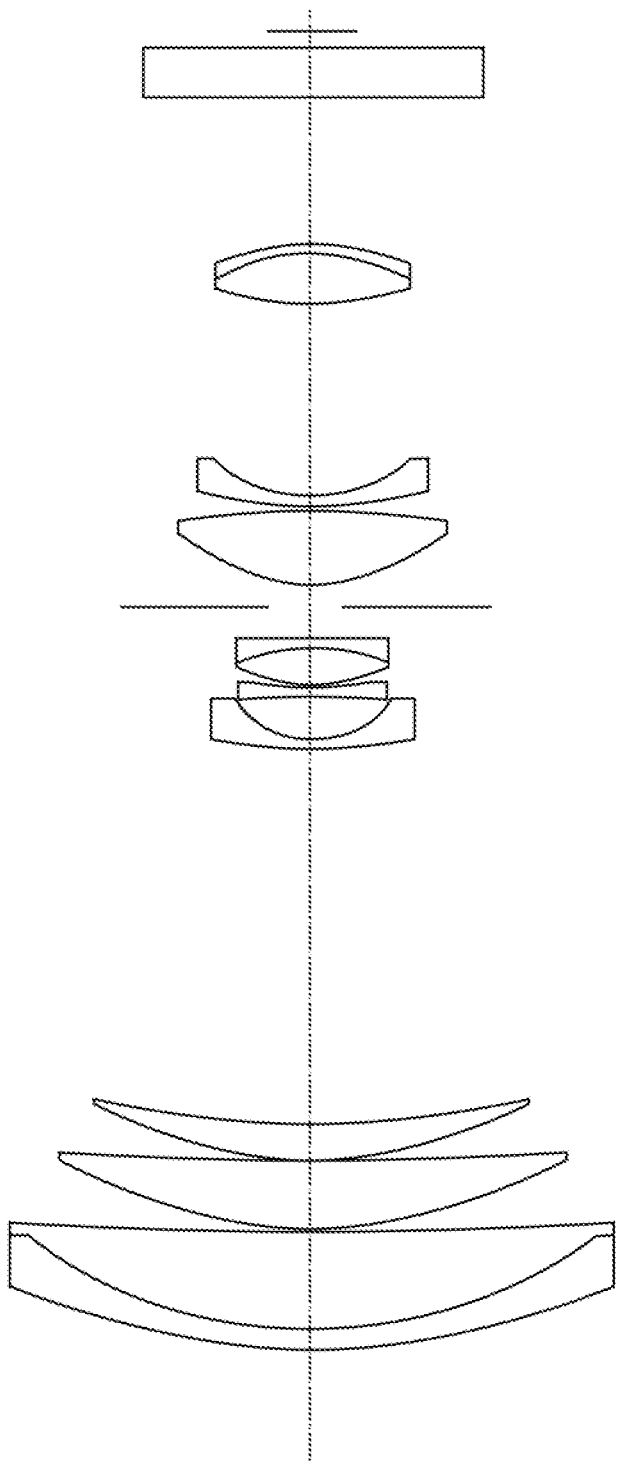
Figure 1D:
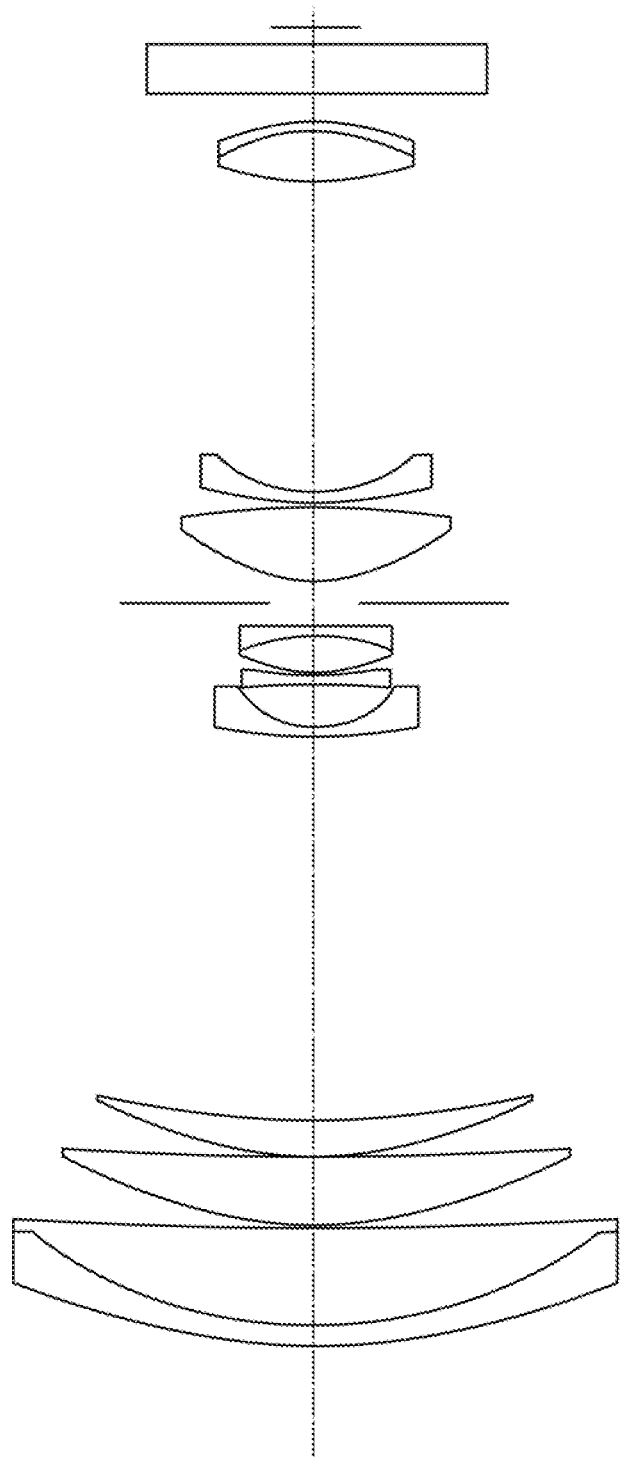
Figure 2A:
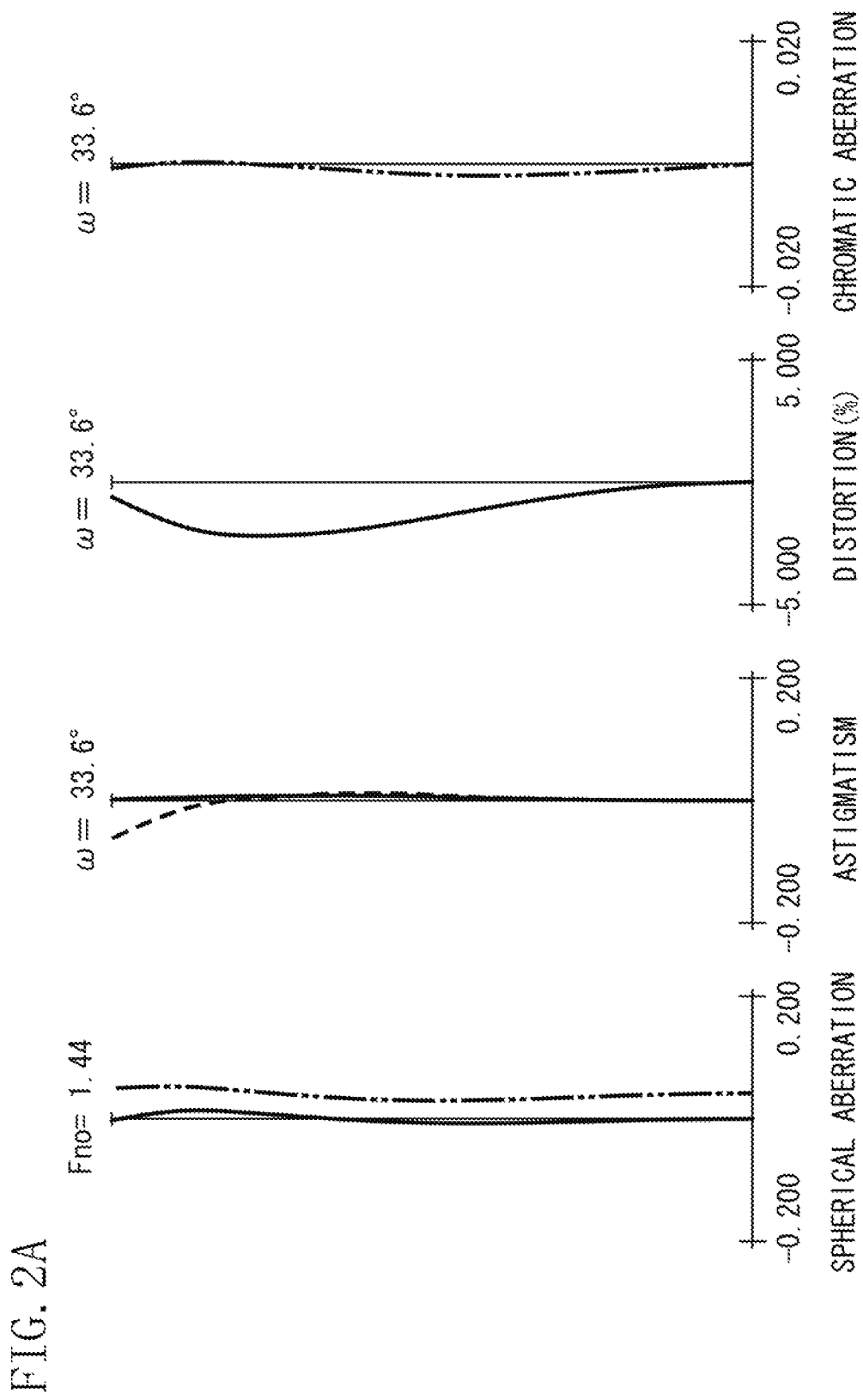
Figure 2B:
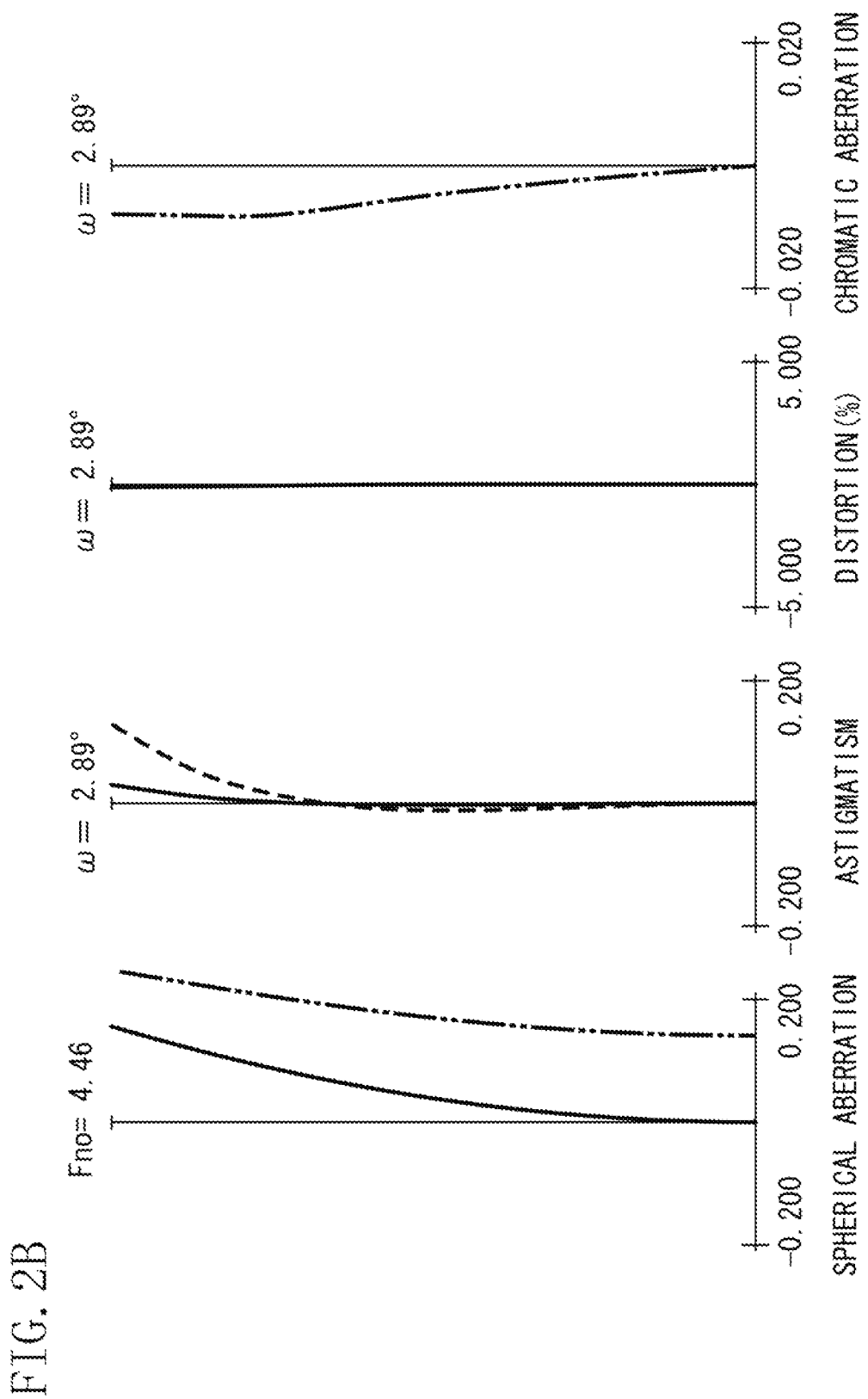
Figure 2D:
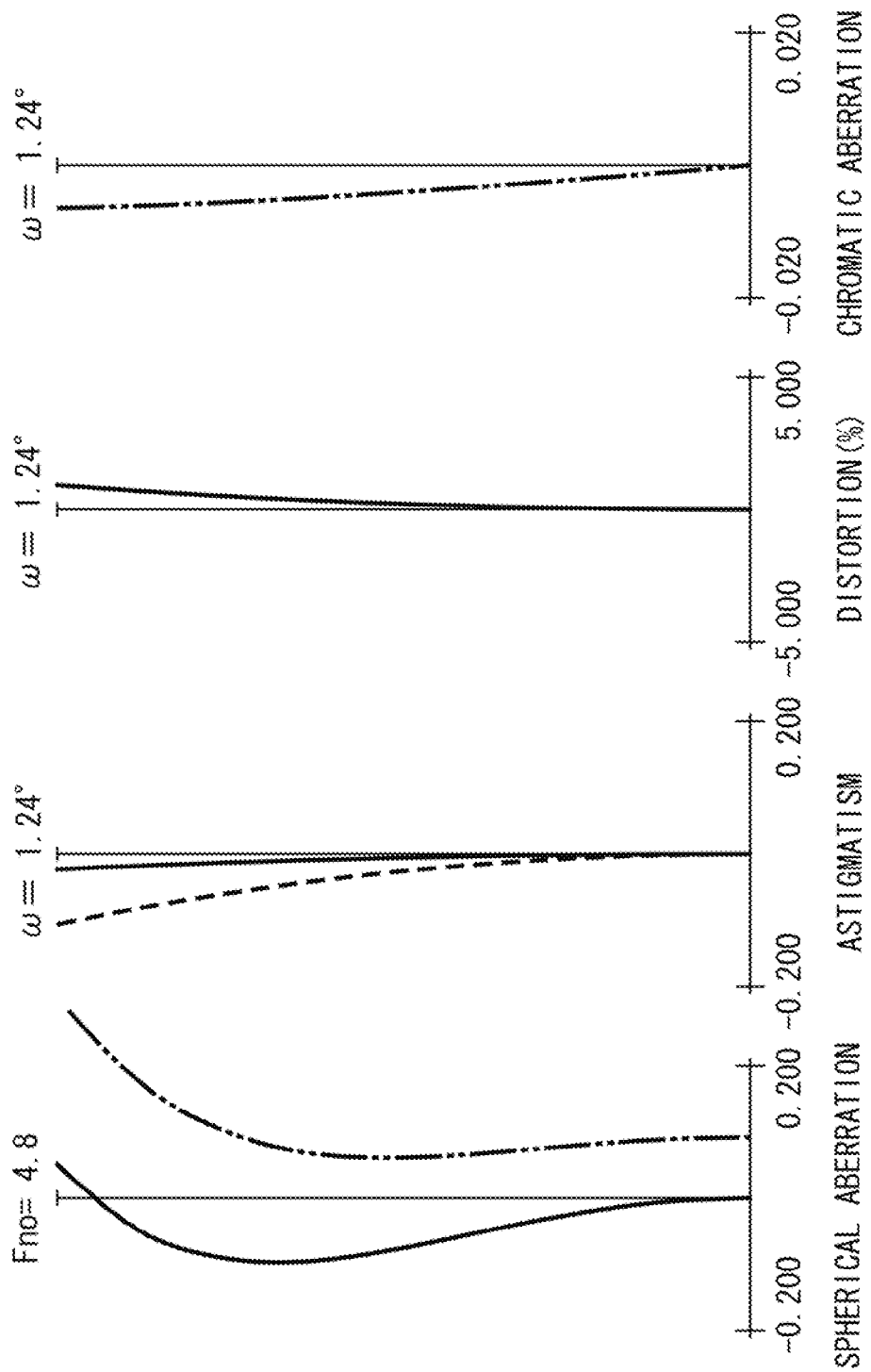
Figure 3B:
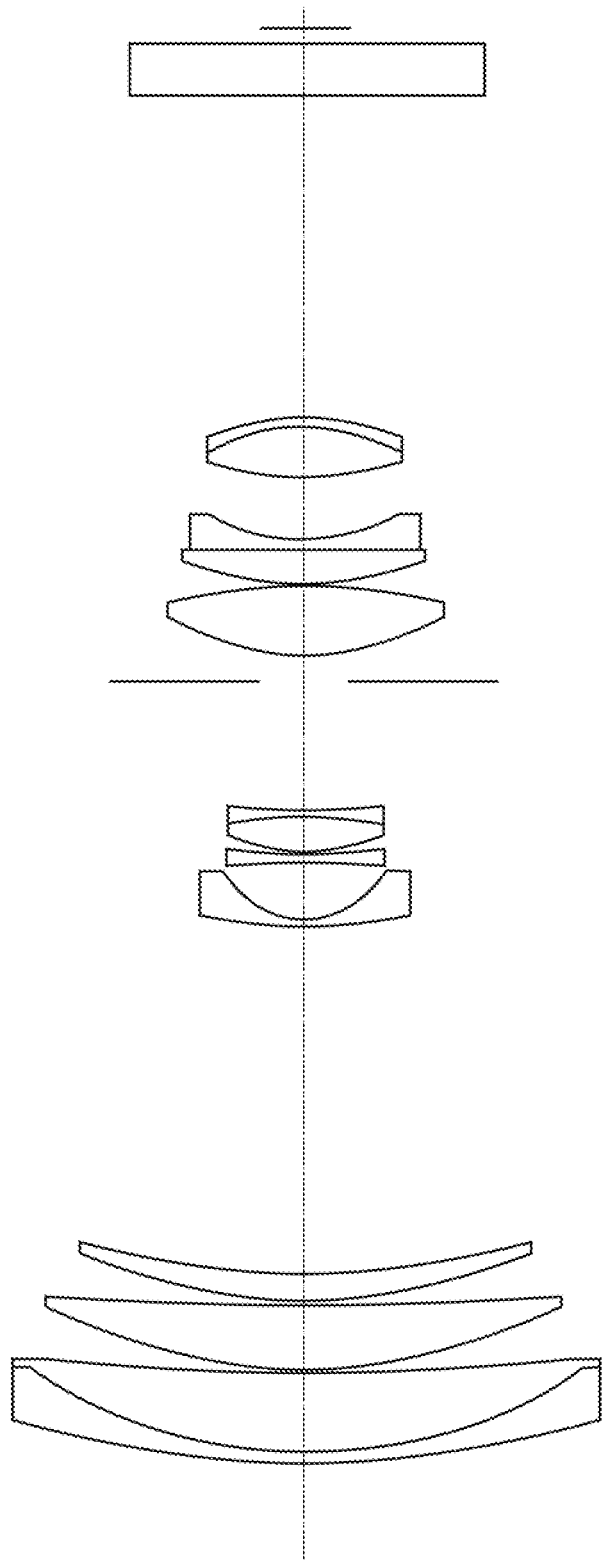
Figure 3C:
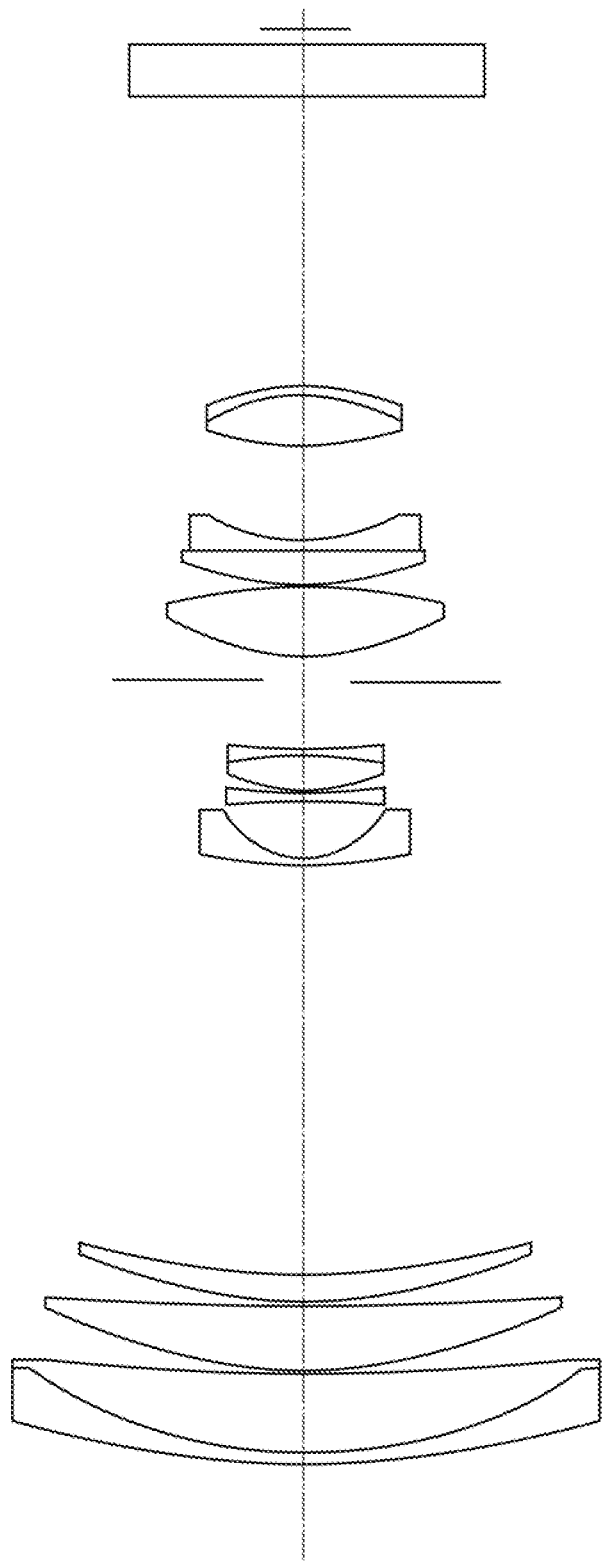
Figure 3D:
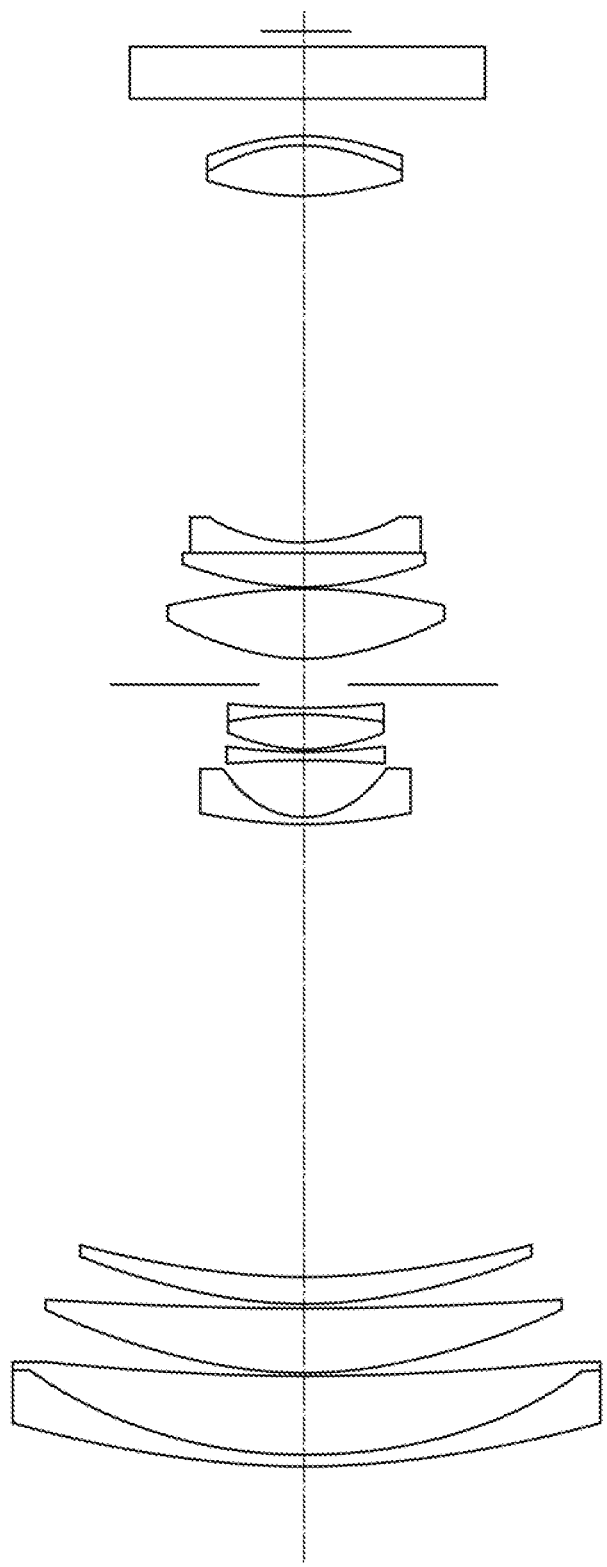
Figure 4B:
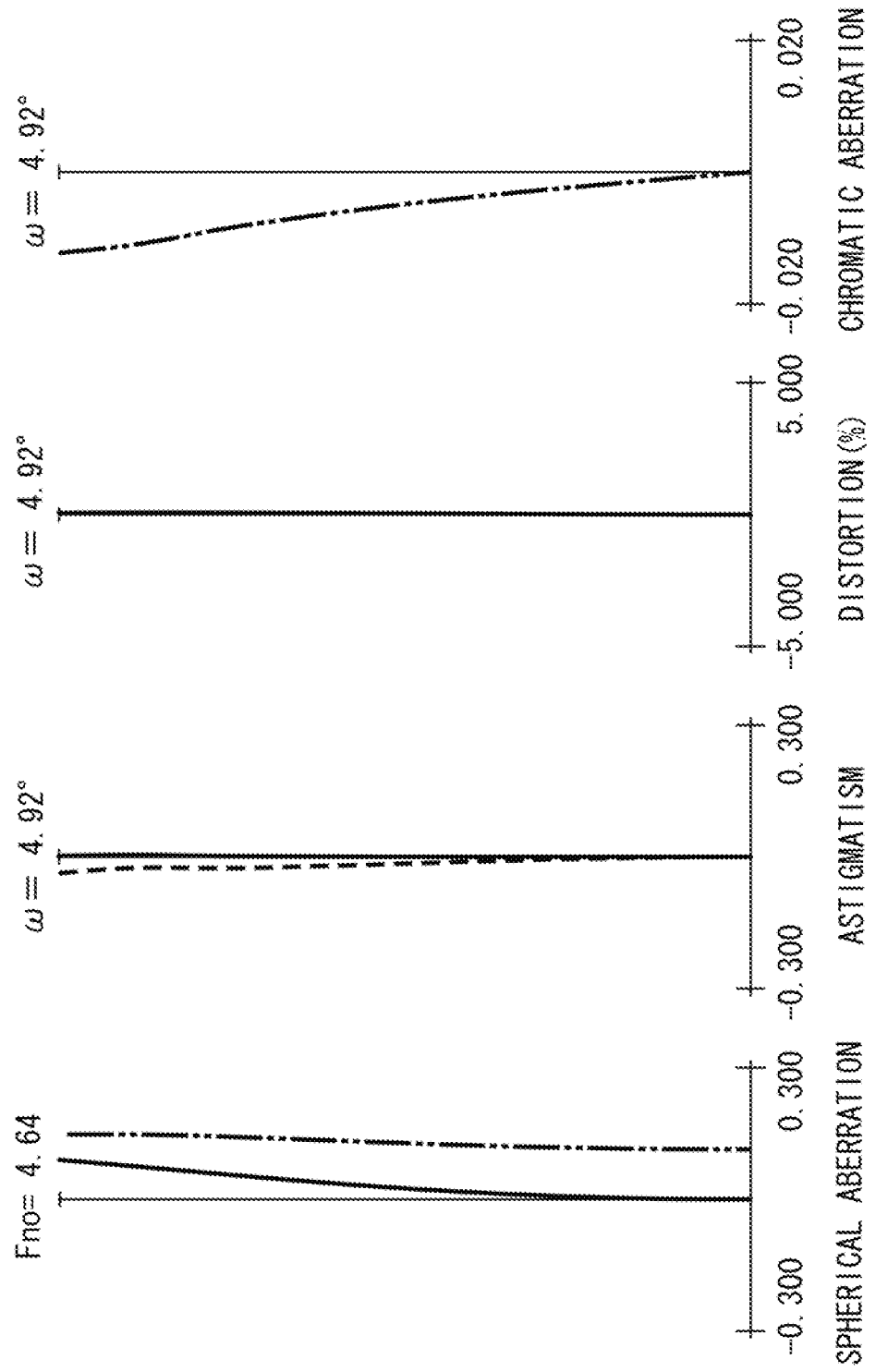
Figure 4C:
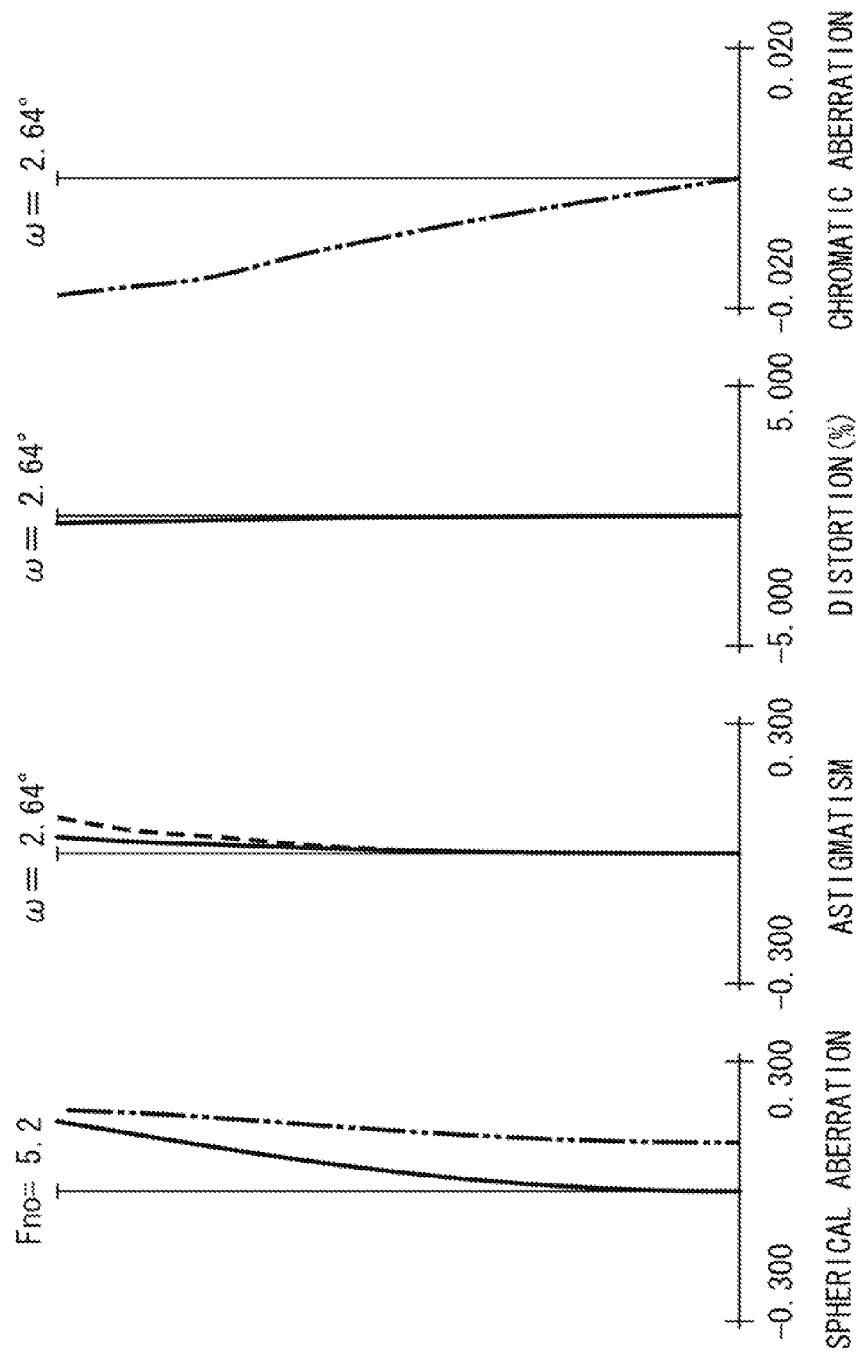
Figure 4D:
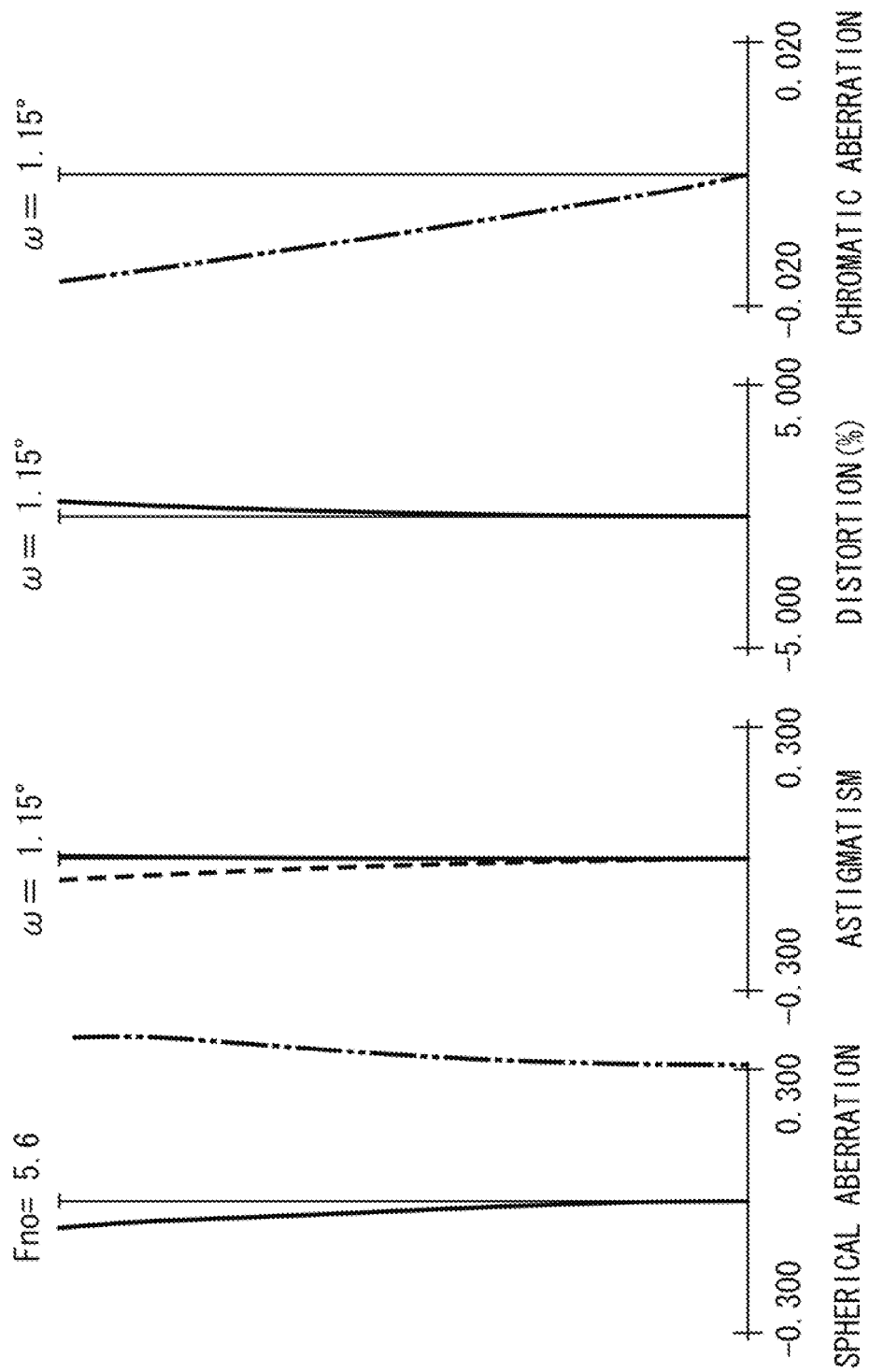
Figure 5B:
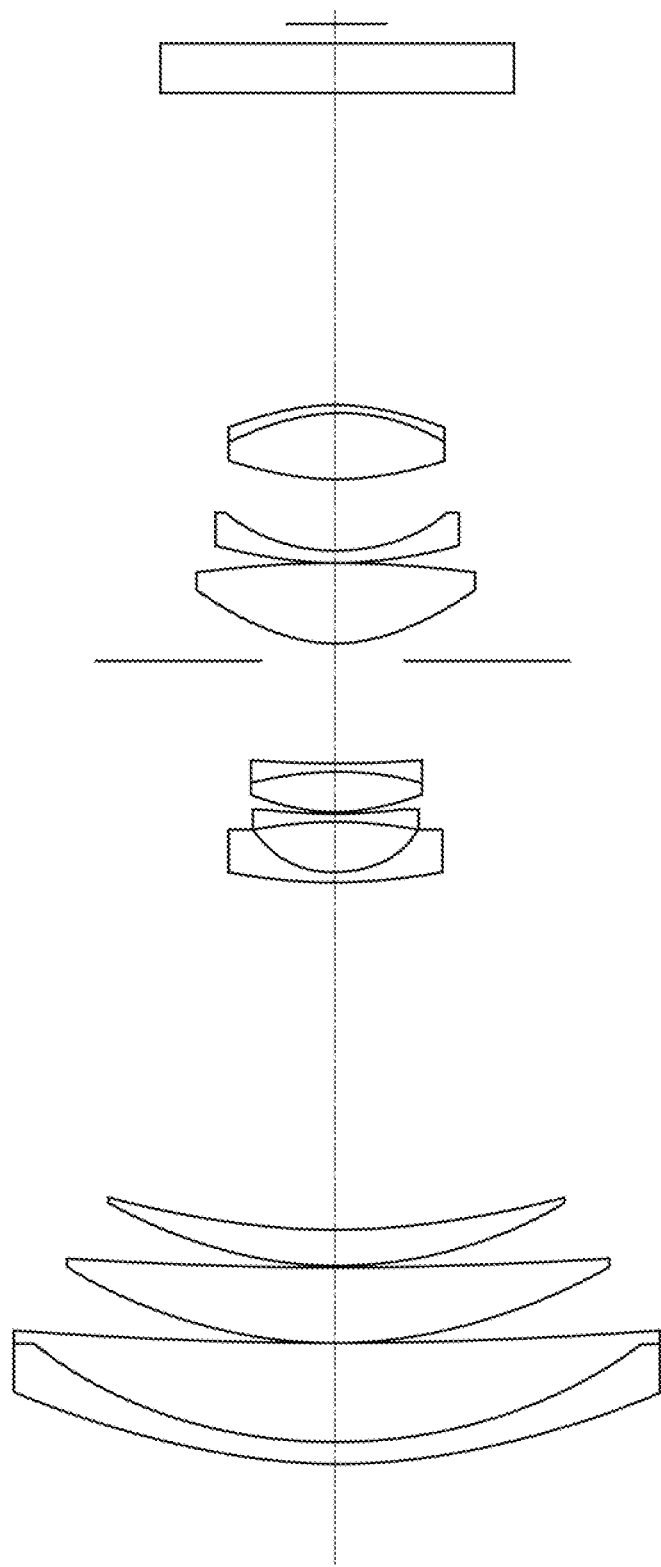
Figure 5C:
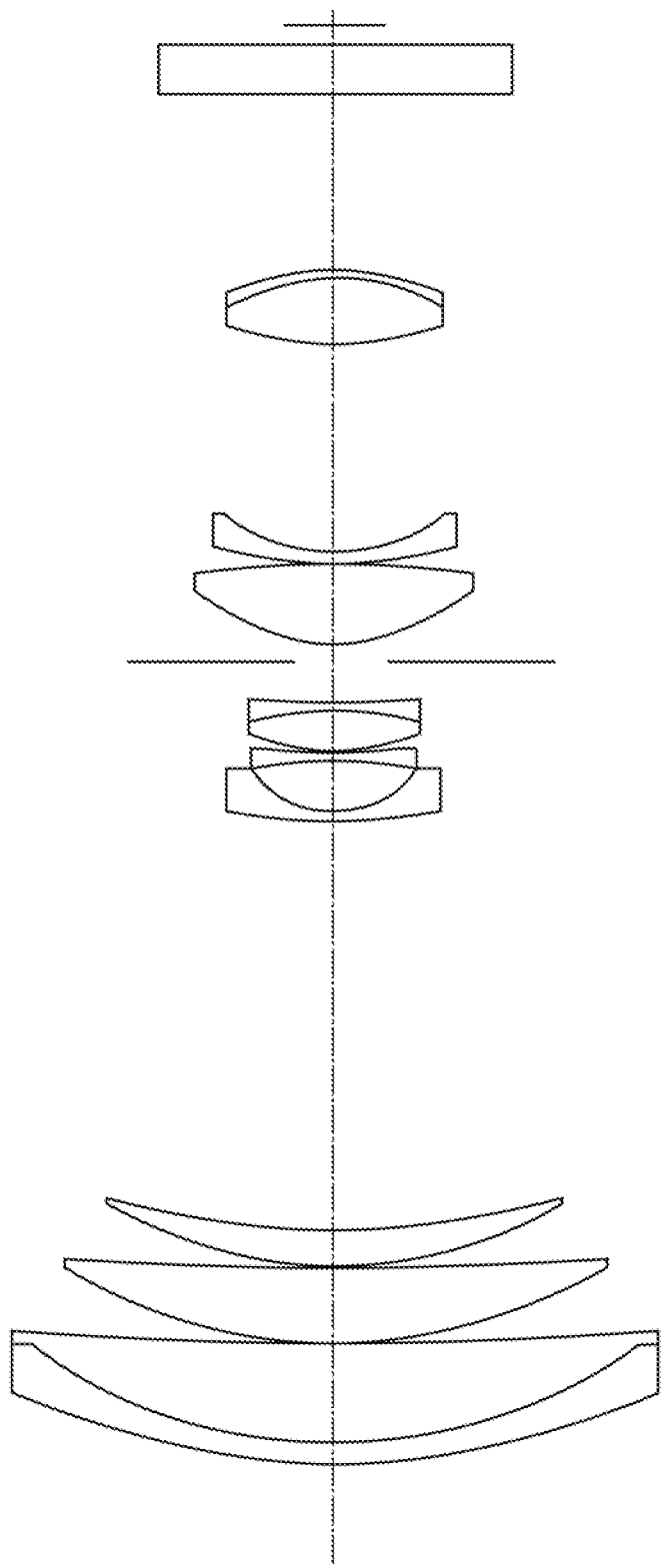
Figure 5D:
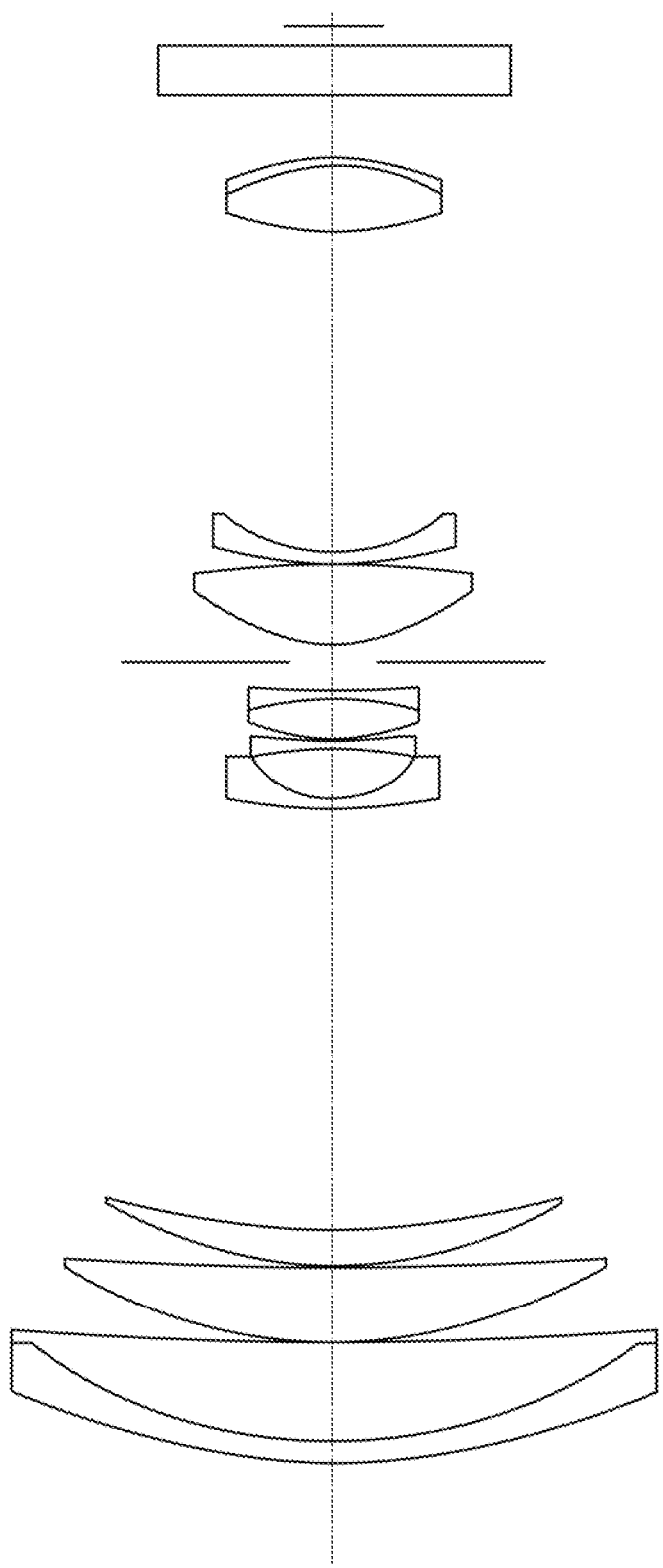
Figure 6A:
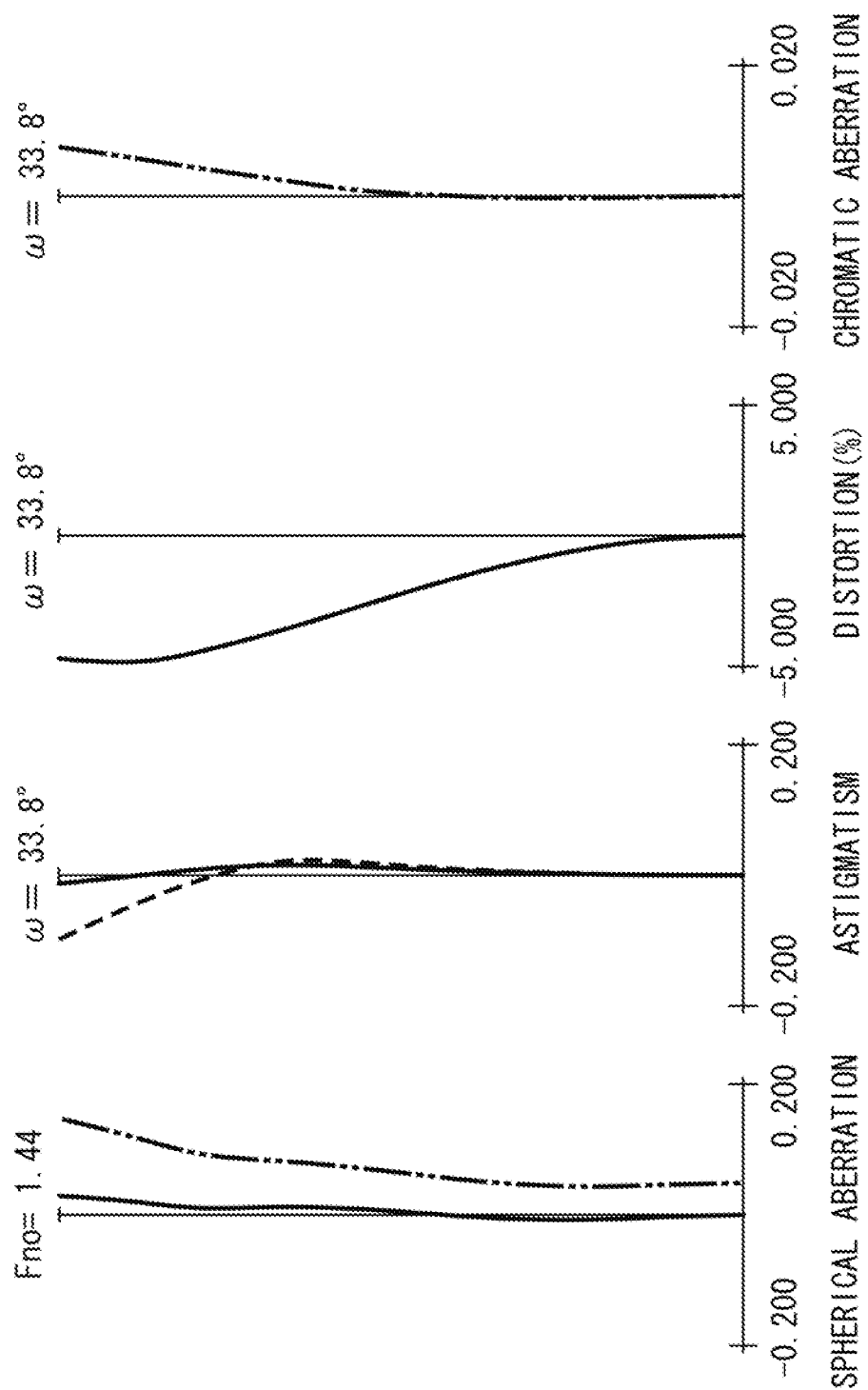
FIGS. 6A, 6B, 6C, and 6D are aberration diagrams of the zoom lens according to the third exemplary embodiment of the invention at the wide-angle end, the first middle zoom position, the second middle zoom position, and the telephoto end, respectively.
Figure 6B:
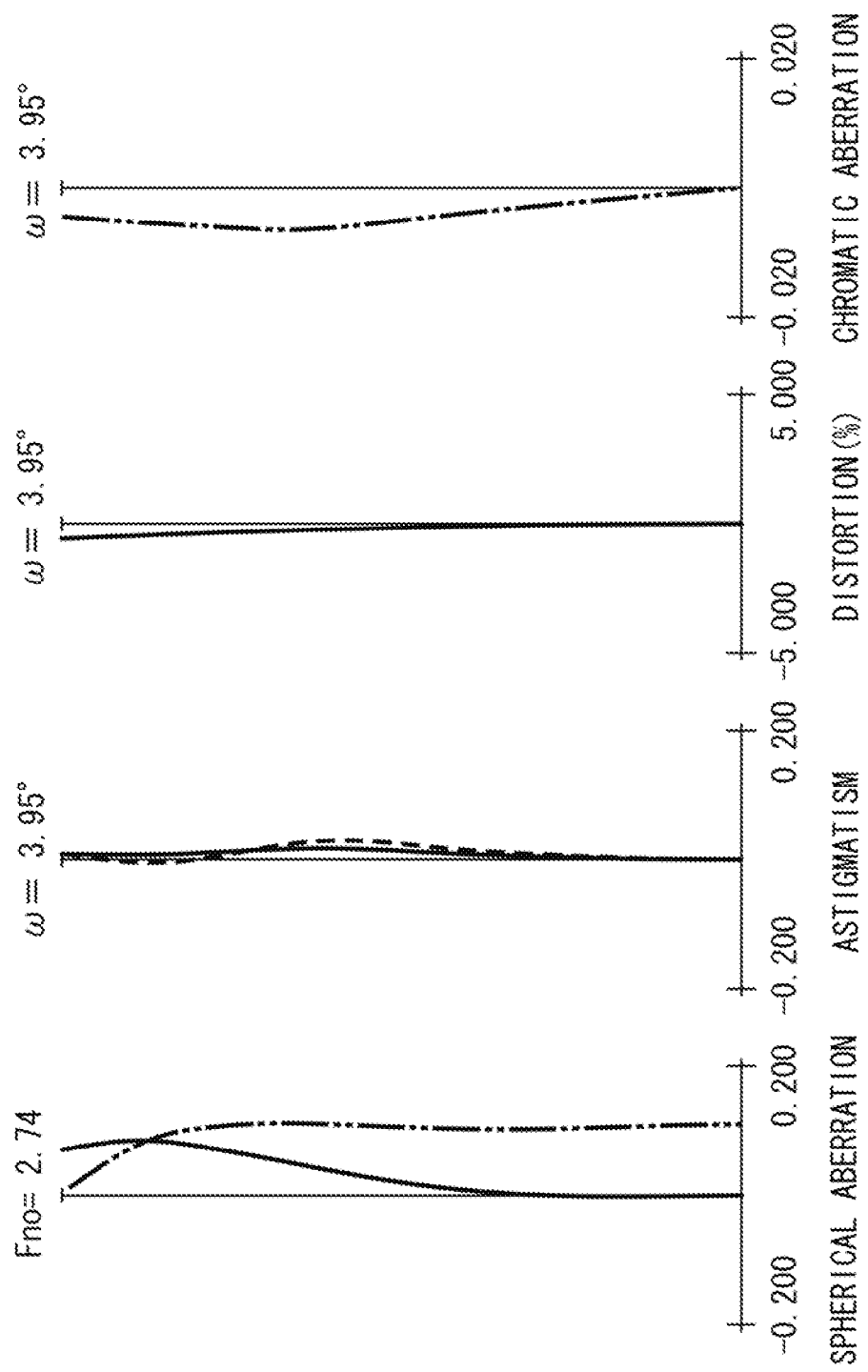
Figure 6C:
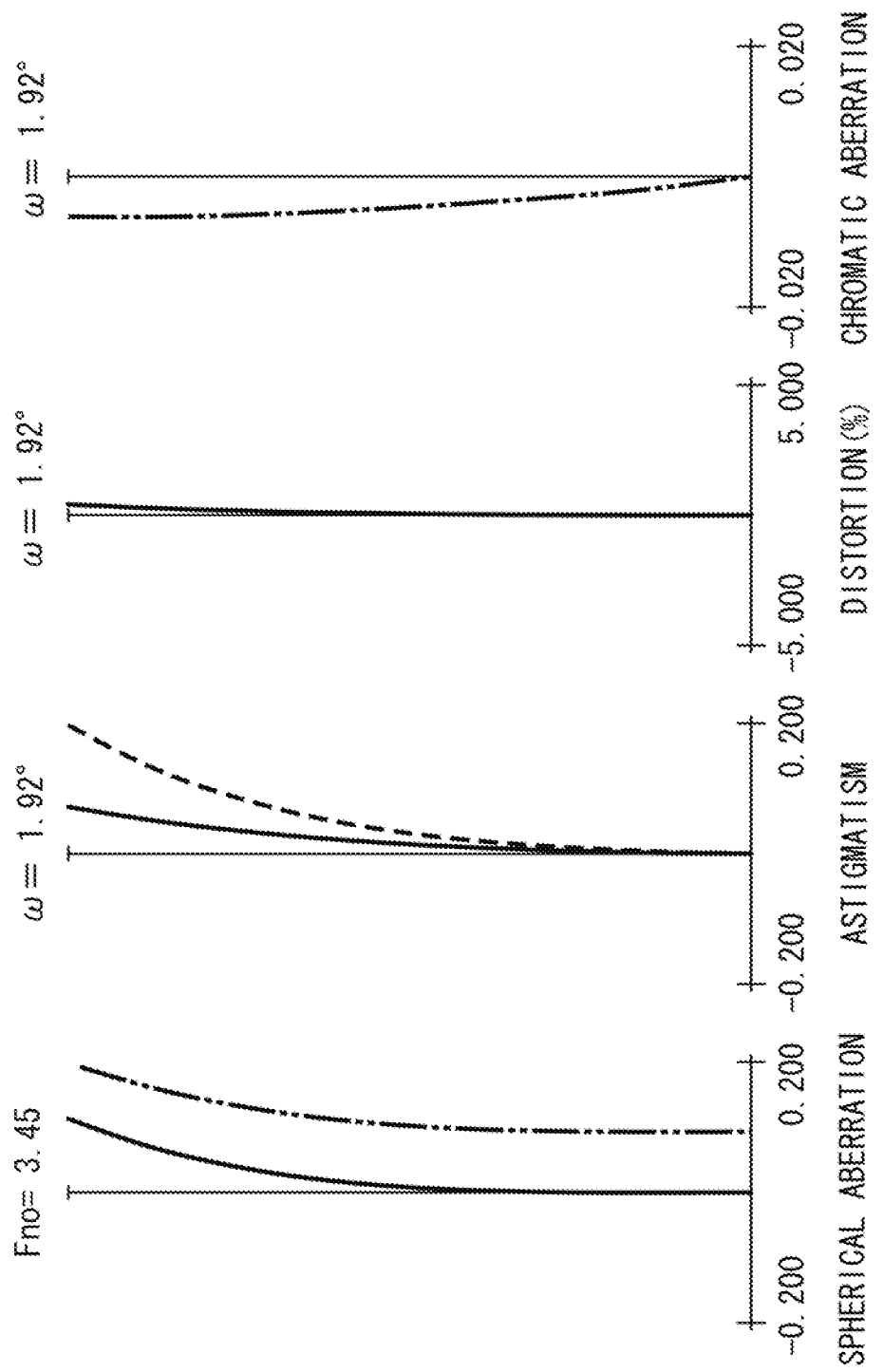
Figure 6D:
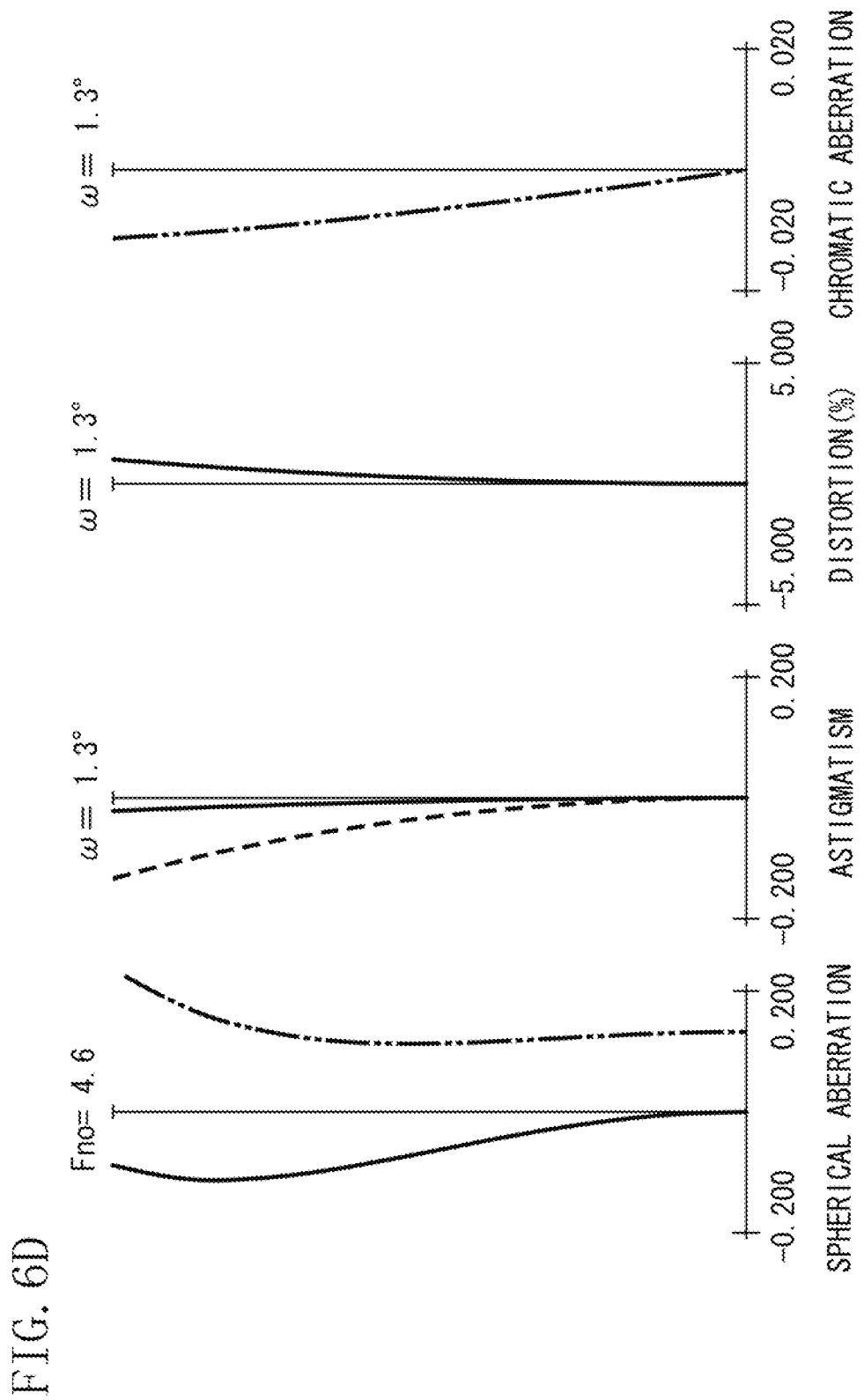
Figure 7B:
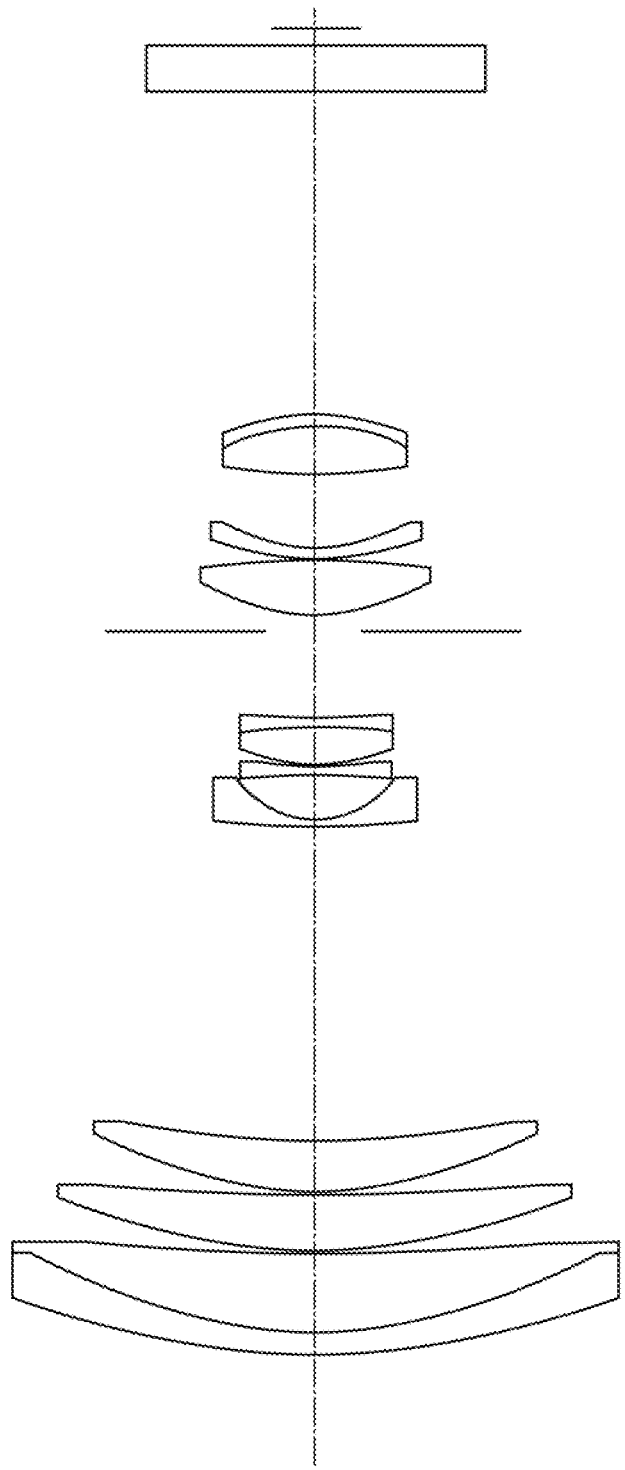
Figure 7C:
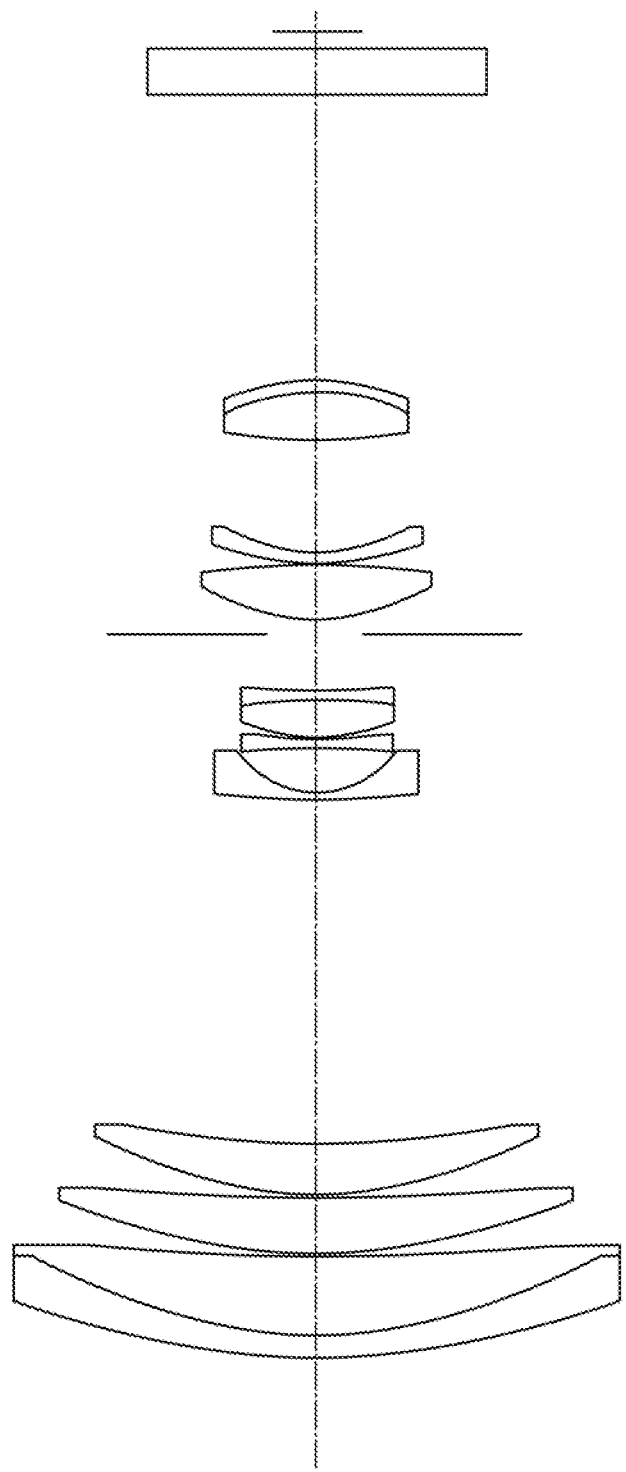
Figure 7D:
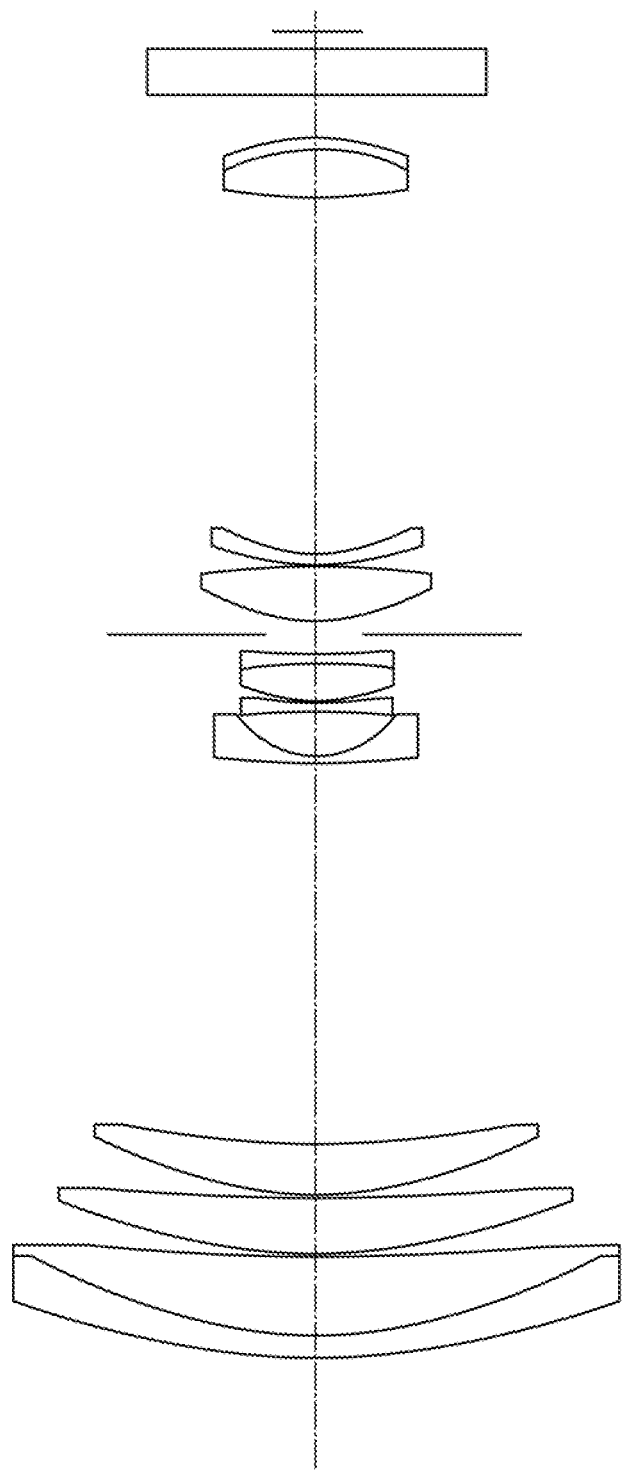
Figure 8C:
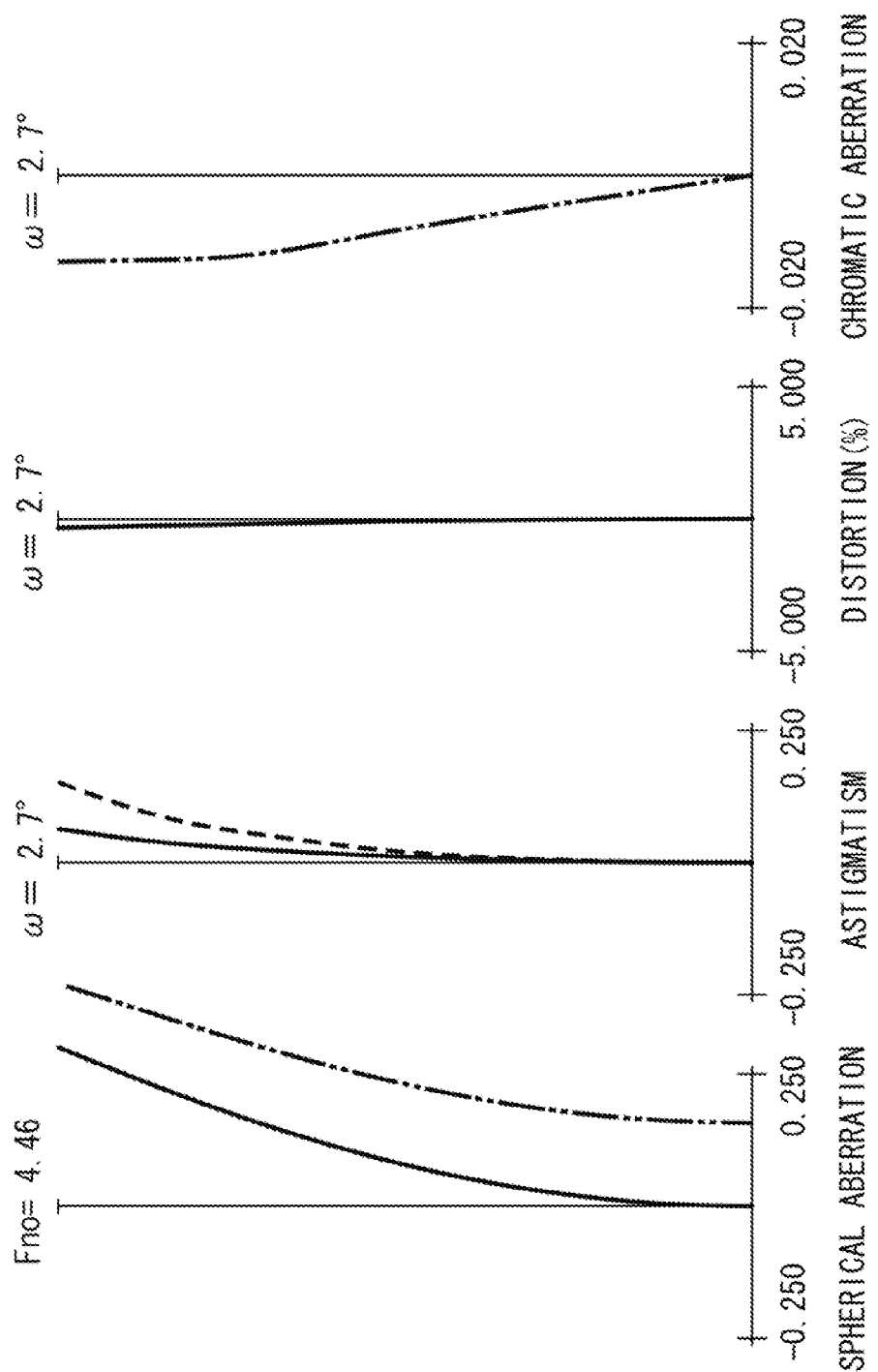

Various exemplary embodiments, features, and aspects of the invention will be described in detail below with reference to the drawings.

A zoom lens according to an exemplary embodiment of the invention includes a first lens unit of a positive refractive power (optical power=inverse of focal length), a second lens unit of a negative refractive power, a third lens unit of a positive refractive power, and a fourth lens unit of a positive refractive power in order from an object side to an image side. For zooming, the first lens unit does not move, and at least the second and fourth lens units are moved.

The second lens unit is monotonically moved towards the image side during zooming from the wide-angle end to the telephoto end. In addition, at the telephoto end in comparison with the wide-angle end, a distance between the first and second lens units increases, and a distance between the second and third lens units decreases.

FIGS. 1A, 1B, 1C, and 1D are lens cross-sectional views illustrating a zoom lens according to a first exemplary embodiment of the invention at a wide-angle end (short focal length end), a first middle zoom position, a second middle zoom position, and a telephoto end (long focal length end), respectively. FIGS. 2A, 2B, 2C, and 2D are aberration diagrams of the zoom lens according to the first exemplary embodiment of the invention at the wide-angle end, the first middle zoom position, the second middle zoom position, and the telephoto end, respectively. The zoom lens according to the first exemplary embodiment of the invention has a zoom ratio of 30.56 and an aperture ratio of 1.44 to 4.80.

FIGS. 3A, 3B, 3C, and 3D are lens cross-sectional views illustrating a zoom lens according to a second exemplary embodiment of the invention at the wide-angle end, the first middle zoom position, the second middle zoom position, and the telephoto end, respectively. FIGS. 4A, 4B, 4C, and 4D are aberration diagrams of the zoom lens according to the second exemplary embodiment of the invention at the wide-angle end, the first middle zoom position, the second middle zoom position, and the telephoto end, respectively. The zoom lens according to the second exemplary embodiment of the invention has a zoom ratio of 32.74 and an aperture ratio of 1.60 to 5.60.

FIGS. 5A, 5B, 5C, and 5D are lens cross-sectional views illustrating a zoom lens according to a third exemplary embodiment of the invention at the wide-angle end, the first middle zoom position, the second middle zoom position, and the telephoto end, respectively. FIGS. 6A, 6B, 6C, and 6D are aberration diagrams of the zoom lens according to the third exemplary embodiment of the invention at the wide-angle end, the first middle zoom position, the second middle zoom position, and the telephoto end, respectively. The zoom lens according to the third exemplary embodiment of the invention has a zoom ratio of 29.51 and an aperture ratio of 1.44 to 4.60.

FIGS. 7A, 7B, 7C, and 7D are lens cross-sectional views illustrating a zoom lens according to a fourth exemplary embodiment of the invention at the wide-angle end, the first middle zoom position, the second middle zoom position, and the telephoto end, respectively. FIGS. 8A, 8B, 8C, and 8D are aberration diagrams of the zoom lens according to the fourth exemplary embodiment of the invention at the wide-angle end, the first middle zoom position, the second middle zoom position, and the telephoto end, respectively. The zoom lens according to the fourth exemplary embodiment of the invention has a zoom ratio of 32.97 and an aperture ratio of 1.65 to 5.18.

Figure 9:
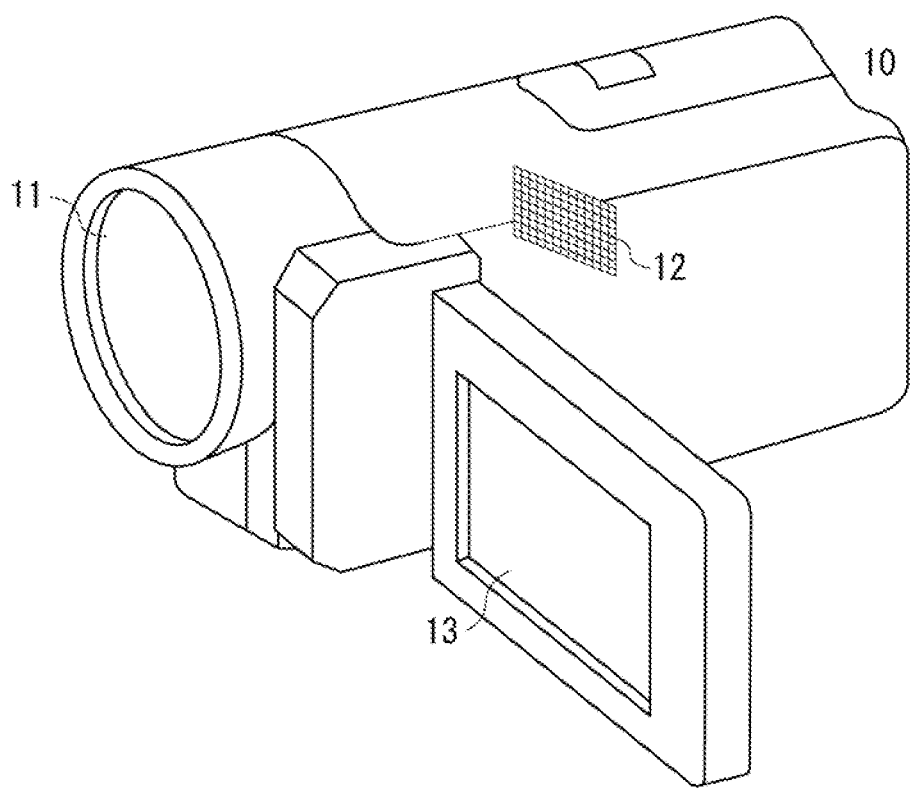
FIG. 9 is a schematic diagram illustrating main parts of an image pickup apparatus according to an exemplary embodiment of the invention.
Figure 10:
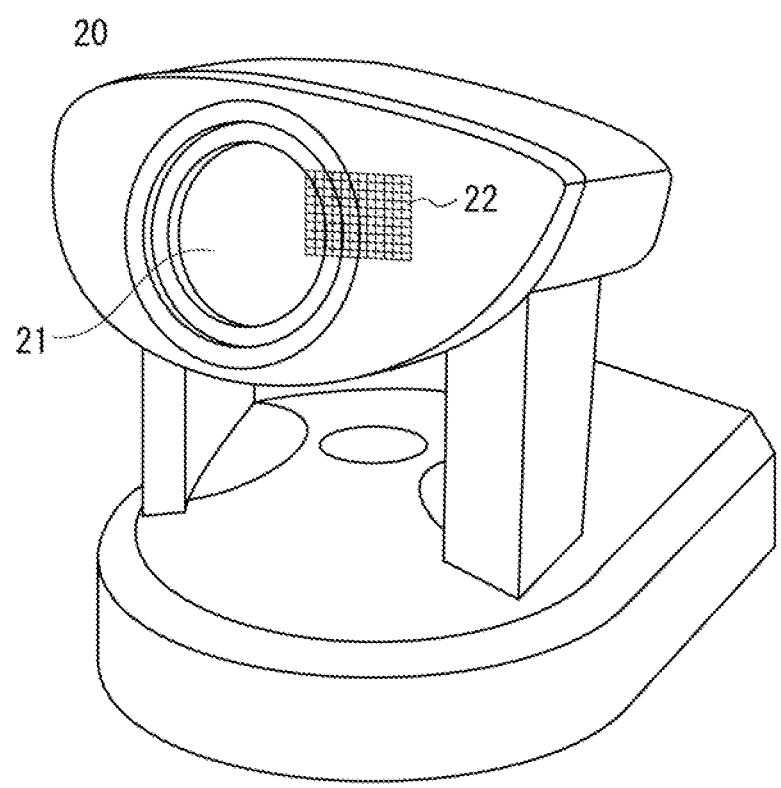
FIG. 10 is a schematic diagram illustrating main parts of an image pickup apparatus according to an exemplary embodiment of the invention.

FIG. 9 is a schematic diagram illustrating main parts of a digital still camera (image pickup apparatus) equipped with a zoom lens according to an exemplary embodiment of the invention. FIG. 10 is a schematic diagram illustrating main parts of a network camera equipped with a zoom lens according to an exemplary embodiment of the invention.

The zoom lens of each exemplary embodiment refers to a photographic lens system used in an image pickup apparatus such as a video camera, a digital still camera, a silver-halide film camera, and a TV camera. However, the zoom lens of each exemplary embodiment may be used as a projection optical system for a projection apparatus (projector). In the lens cross-sectional views, the left side refers to an object side (front side), and the right side refers to an image side (rear side). In addition, in the lens cross-sectional views, i denotes the order of a lens unit from the object side, and Bi denotes the i-th lens unit.

B1 denotes the first lens unit of a positive refractive power (optical power=inverse of focal length), B2 denotes the second lens unit of a negative refractive power, B3 denotes the third lens unit of a positive refractive power, and B4 denotes the fourth lens unit of a positive refractive power. SP denotes an aperture stop for determining (restricting) a light flux having a full-aperture F-number (Fno). G denotes an optical block such as an optical filter, a phase plate, a low-pass filter, an infrared cut-off filter, and the like.

The image plane IP corresponds to an imaging surface of a solid-state image sensor (photoelectric conversion element) such as a CCD sensor or a CMOS sensor when the zoom lens is used in a photographic optical system of a video camera or a digital camera. The image plane IP corresponds to a film surface when the zoom lens is used in a photographic optical system of a silver-halide film camera. The arrows denote movement loci of each lens unit during zooming from the wide-angle end to the telephoto end.

In the zoom lens of each exemplary embodiment, a distance between the first and second lens units B1 and B2 increases, and a distance between the second and third lens units B2 and B3 decreases during zooming from the wide-angle end to the telephoto end.

Specifically, in each exemplary embodiment, zooming from the wide-angle end to the telephoto end is performed by moving the second lens unit B2 towards the image side, and an image plane variation caused by zooming is corrected by moving the fourth lens unit B4 along apart of the locus that is convex towards the object side. In addition, focusing is performed by moving the fourth lens unit B4 along an optical axis. The solid line curve 4a and the dotted line curve 4b of the fourth lens unit B4 represent movement loci for correcting an image plane variation during zooming from the wide-angle end to the telephoto end when focusing is performed for an infinitely-distant object and a close object, respectively.

In addition, focusing from an infinitely-distant object to a close object at the telephoto end is performed by moving the fourth lens unit B4 forward (towards the front side) as indicated by the arrow 4c.

According to the fourth exemplary embodiment of the invention, the third lens unit B3 is moved towards the object side during zooming from the wide-angle end to the telephoto end. In the first to fourth exemplary embodiments of the invention, the aperture stop SP does not move for zooming. However, the aperture stop SP may be moved if necessary.

In the aberration diagrams, Fno denotes an F-number, and ω denotes a half angle of view obtained by tracking a light beam. In the spherical aberration diagrams, the solid line denotes d-line (of a wavelength of 587.6 nm), and the dotted line between two points denotes g-line (of a wavelength of 435.8 nm).

In the astigmatism diagrams, the solid lines and the dotted lines denote sagittal and meridional image planes on a d-line, respectively. Distortion is indicated by d-line. In the diagrams of chromatic aberration of magnification, the dotted lines between two points denote g-line. In each exemplary embodiment described below, the wide-angle end and the telephoto end refer to zoom positions when the lens unit for zooming is located in respective ends of the movable range on an optical axis of a mechanism.

In each exemplary embodiment, the first lens unit B1 includes at least one positive lens 1i. When vd1i and θgF1i denote an Abbe number and a relative partial dispersion, respectively, of a material of the positive lens 1i, n2na denotes an average refractive index of materials of negative lenses included in the second lens unit B2, m2 denotes a movement amount of the second lens unit B2 during zooming from the wide-angle end to the telephoto end, f2 denotes a focal length of the second lens unit B2, ft denotes a focal length of the entire zoom lens at the telephoto end, and it is assumed that the movement amount refers to a positional difference between the wide-angle end and the telephoto end on an optical axis, the following conditions are satisfied:

$$0.5826 < \theta gF1i + 0.001618 \times (vd1i - 36.23) < 0.8000 \quad (1)$$

$$0.040 < \sqrt{(|f2| \times m2)}/ft < 0.095 \quad (2)$$

$$1.90 < n2na < 2.50 \quad (3)$$

In addition, the Abbe number vd and the relative partial dispersion θgF are defined as follows:

$$vd = (Nd-1)/(NF-NC), \text{ and}$$

$$\theta gF = (Ng-NF)/(NF-NC),$$

where Nd, NF, NC, and Ng denote refractive indices of the Fraunhofer d-line, the Fraunhofer F-line, the Fraunhofer C-line, and the Fraunhofer g-line, respectively.

The zoom lens according to an exemplary embodiment of the invention includes first to fourth lens units of positive, negative, positive, and positive refractive powers, respectively, in order from the object side in order to obtain a high zoom ratio and appropriately correct various types of aberration. Since the first lens unit B1 does not move relative to the image-forming surface during zooming, it is possible to maintain high positional accuracy and reduce a variation of the entire lens length during zooming. In addition, since the number of movable lens units is reduced, it is possible to simplify a mechanical component. Since the mechanical component is simplified, it is possible to facilitate an assembling work and reduce the generation of dust, thereby obtaining high performance.

In addition, it is possible to facilitate installation of accessories such as a converter lens by increasing the strength of the lens barrel.

In the first to third exemplary embodiments of the invention, zooming is performed using the second and fourth lens units B2 and B4, and the number of movable lens units is reduced so that it is possible to miniaturize the entire zoom lens and simplify the configuration. In the first lens unit B1 of the zoom lens of each exemplary embodiment, the off-axial light flux passes through a position distant from the optical axis. In addition, in such a lens configuration, the entire lens length or the lens diameter is significantly affected. For this reason, it is important to appropriately set a material (glass material) or configuration of the lens.

The condition (1) is to define a relationship between the Abbe number and the relative partial dispersion of a material of a positive lens of the first lens unit B1. A material capable of satisfying the condition (1) has an extraordinary dispersion property. In a material that fails to satisfy the condition (1), the extraordinary dispersion property necessary to reduce a secondary spectrum is low. If the extraordinary dispersion property is low, the secondary spectrum increases at the telephoto side when a high zoom ratio is implemented, and it is difficult to correct such a phenomenon. Having a positive lens of the first lens unit B1 that satisfies condition (1) improves the ability to reduce the secondary spectrum of the zoom lens at the telephoto side when the zoom ratio is high.

The condition (2) is to define the focal length f2 of the second lens unit B2 and the movement amount m2 of the second lens unit B2 on the optical axis during zooming from the wide-angle end to the telephoto end using the focal length ft at the telephoto end.

If the focal length of the second lens unit B2 increases, or the movement amount of the second lens unit B2 during zooming increases, with the upper limit of the condition (2) exceeded, it is necessary to increase the entire lens length to obtain a high zoom ratio, which is not desirable.

If the focal length of the second lens unit B2 decreases, or the movement amount of the second lens unit B2 during zooming decreases, with the lower limit of the condition (2) exceeded, it is advantageous to obtain a high zoom ratio and reduce the entire lens length. However, the Petzval sum increases in a negative direction, and curvature of field increases.

The condition (3) is to define an average refractive index of materials of negative lenses included in the second lens unit B2. If the refractive index increases with the upper limit of the condition (3) exceeded, a radius of curvature of the lens surface of the negative lens increases so that it is difficult to correct various types of aberration such as, particularly, distortion at the wide-angle end.

If the refractive index decreases with the lower limit of the condition (3) exceeded, the radius of curvature of the lens surface of the negative lens decreases to provide a predetermined refractive power, so that it is difficult to correct astigmatism. In addition, it is necessary to restrict the refractive power of the second lens unit B2 in order to correct curvature of field and obtain a high zoom ratio. Therefore, the movement amount of the second lens unit B2 increases to obtain a predetermined zoom ratio so that the entire lens length increases.

The aforementioned problems do not occur if the values are within the ranges defined in the conditions (1) to (3). For this reason, there is no need to add another lens to the first or second lens unit B1 or B2 or add a number of aspheric lenses. Therefore, it is possible to reduce the number of lenses in each lens unit, facilitate miniaturization of the entire zoom lens, and easily maintain high optical performance.

In each exemplary embodiment, more usefully, the numerical ranges of the conditions (1) to (3) are set as follows:

$$0.59 < \theta gF1i + 0.001618 \times (vd1i - 36.23) < 0.70 \quad (1a)$$

$$0.060 < \sqrt{(|f2| \times m2)}/ft < 0.091 \quad (2a)$$

$$1.90 < n2na < 2.20 \quad (3a)$$

If the condition (1a) is satisfied, it is possible to achieve miniaturization of the entire zoom lens and more easily and appropriately correct chromatic aberration at the telephoto side. If the condition (2a) is satisfied, it is possible to prevent an increase of the entire lens length, easily obtain a high zoom ratio, and more easily suppress a variation in curvature of field across the entire zoom range. If the condition (3a) is satisfied, it is possible to suppress an increase of the Petzval sum in a negative direction when the entire lens length is reduced. Therefore, it is possible to more easily and appropriately correct curvature of field.

More usefully, the numerical ranges of the conditions (1a) to (3a) are set as follows:

$$0.59 < \theta gF1i + 0.001618 \times (vd1i - 36.23) < 0.65 \quad (1b)$$

$$0.070 < \sqrt{(|f2| \times m2)}/ft < 0.090 \quad (2b)$$

$$1.90 < n2na < 2.00 \quad (3b)$$

As a result, in each exemplary embodiment, it is possible to obtain a zoom lens having little chromatic aberration with a high zoom ratio and a wide angle of view and miniaturize the entire zoom lens.

In each exemplary embodiment, more usefully, at least one of the following conditions is satisfied:

$$0.4 < |f2n1|/fw < 1.8 \quad (4),$$

$$-1.8 < SF1p < -0.8 \quad (5),$$

$$0.8 < |f1n1/f1p1| < 1.4 \quad (6),$$

$$1.2 < f1/\sqrt{(fw \times ft)} < 1.8 \quad (7),$$

$$0.40 < DSP/TDw < 0.55 \quad (8), \text{ and}$$

$$0.8 < |m2|/\sqrt{(fw \times ft)} < 1.4 \quad (9),$$

where a negative lens is arranged in a position closest to the object side of the second lens unit B2, f2n1 denotes a focal length of the negative lens of the second lens unit B2, fw and ft denote focal lengths of the entire zoom lens at the wide-angle end and telephoto end, respectively, SF1p denotes a shape factor of a positive lens closest to the object side of the first lens unit B1, f1n1 denotes a focal length of a negative lens closest to the object side of the first lens unit B1, f1p1 denotes a focal length of the positive lens closest to the object side of the first lens unit B1, f1 denotes a focal length of the first lens unit B1, an aperture stop SP is provided on the object side of the third lens unit B3, TDw denotes the entire lens length of the zoom lens at the wide-angle end, and DSP denotes an air-equivalent distance (a distance when a parallel surface plate such as a filter is removed) from the aperture stop SP to the image plane at the wide-angle end.

Here, if the shape factor SF1p of the positive lens is defined as follows:

$$SF1p = (R1 + R2)/(R1 - R2),$$

where R1 denotes a radius of curvature of the lens surface on the object side of the positive lens, and R2 denotes a radius of curvature of the lens surface on the image side of the positive lens.

Next, technical meanings of each of the aforementioned conditions will be described. The condition (4) is to define a focal length of the negative lens closest to the object side of the second lens unit B2 using a focal length of the entire zoom lens at the wide-angle end to appropriately correct mainly the image plane characteristic. If the refractive index of the negative lens closest to the object side decreases with the upper limit of the condition (4) exceeded, it is difficult to maintain curvature of field, axial chromatic aberration, chromatic aberration of magnification, and the like across the entire zoom range with an excellent balance. In addition, it is difficult to set a lens configuration for appropriately correcting off-axial coma.

If the refractive index of the negative lens closest to the object side increases with the lower limit of the condition (4) exceeded, the Petzval sum increases in a negative direction, and the image plane characteristic is deteriorated. In addition, it is difficult to bring the principal point position of the second lens unit B2 close to the principal point position of the first lens unit B1, and the size of the lens increases in a radial direction to obtain a wide angle of view.

The condition (5) is to appropriately set the shape factor of the positive lens closest to the object side of the first lens unit B1 to appropriately correct curvature of field across the entire zoom range from the wide-angle end to the telephoto end and appropriately correct spherical aberration and axial chromatic aberration at the telephoto side. If the upper limit of the condition (5) is exceeded, an effect of spherical aberration correction at the telephoto side decreases. In addition, an effect of aberration correction for the off-axial light flux at the telephoto side is insufficient, so that curvature of field increases. If the lower limit of the condition (5) is exceeded, it is difficult to correct curvature of field at the wide-angle side and spherical aberration at the telephoto side with an excellent balance.

The condition (6) is to define a ratio between the focal length of the negative lens closest to the object side of the first lens unit B1 and the focal length of the positive lens closest to the object side of the first lens unit B1. If the upper limit of the condition (6) is exceeded, the refractive index of the negative lens closest to the object side of the first lens unit B1 decreases, so that a reduction of the entire lens length is insufficient. In addition, it is difficult to appropriately correct spherical aberration, coma, and the like at the telephoto side.

If the lower limit of the condition (6) is exceeded, the refractive index of the negative lens closest to the object side of the first lens unit B1 increases, so that it is advantageous to reduce the entire lens length at the telephoto end. However, an image plane tilt caused by a manufacturing error of the first lens unit B1 or an image shake during zooming increases, so that it is necessary to provide a high-precision lens barrel, which is not desirable.

The condition (7) is to define the refractive index of the first lens unit B1 in order to obtain a wide angle of view and appropriately correct mainly spherical aberration, coma, and the like. If the upper limit of the condition (7) is exceeded, the refractive index of the first lens unit B1 decreases, so that it is difficult to reduce the entire lens length. In addition, it is difficult to obtain a high zoom ratio. If the lower limit of the condition (7) is exceeded, the refractive index of the first lens unit B1 increases, so that it is advantageous to obtain a wide angle of view. However, it is difficult to correct spherical aberration, coma, and the like.

The condition (8) is to define the position of the aperture stop SP in an optical axis direction at the wide-angle end. If the upper limit of the condition (8) is exceeded, a variation of the distance from the optical axis of the marginal light flux incident on the periphery of the image plane of the lens unit located on the rear side (image side) relative to the aperture stop SP increases. As a result, in order to appropriately correct aberration of the light flux of the image plane periphery, it is necessary to increase the number of lenses or increase the number of aspheric surfaces. This increases the size of the entire zoom lens and makes manufacturing difficult. If the lower limit of the condition (8) is exceeded, the incident height of the off-axial light flux of the first lens unit B1 at the telephoto end side is away from the optical axis, so that the size of the first lens unit B1 increases in a radial direction.

The condition (9) is to define a movement amount along the optical axis for zooming of the second lens unit B2 so as to miniaturize the entire zoom lens. If the upper limit of the condition (9) is exceeded, the movement amount of the second lens unit B2 during zooming increases, so that it is difficult to reduce the entire lens length at the wide-angle end, and the size of the first lens unit B1 increases in a radial direction.

If the lower limit of the condition (9) is exceeded, the movement amount of the second lens unit B2 during zooming is reduced, so that it is necessary to increase the refractive index of the second lens unit B2 in order to obtain a predetermined zoom ratio. In this case, a variation of curvature of field caused by zooming increases, so that it is difficult to appropriately correct curvature of field across the entire zoom range.

More usefully, the numerical ranges of the conditions (4) to (9) are set as follows:

$$0.8 < |f2n1|/fw < 1.7 \quad (4a)$$

$$-1.6 < SF1p < -1.0 \quad (5a)$$

$$0.85 < |f1n1|/f1p1 < 1.35 \quad (6a)$$

$$1.3 < f1/\sqrt{(fw \times ft)} < 1.6 \quad (7a)$$

$$0.41 < DSP/TDw < 0.50 \quad (8a)$$

$$0.85 < |m2|/\sqrt{(fw \times ft)} < 1.20 \quad (9a)$$

If the condition (4a) is satisfied, it is possible to facilitate a high zoom ratio and a reduction of the entire lens length.

In addition, it is possible to easily and appropriately correct curvature of field or astigmatism when a retro-focus refractive index arrangement is provided in the wide-angle side. If the condition (5a) is satisfied, it is possible to appropriately correct curvature of field across the entire zoom range from the wide-angle end to the telephoto end and more easily restrict the number of lenses of the first lens unit B1.

If the condition (6a) is satisfied, it is possible to more easily correct axial chromatic aberration at the telephoto end and suppress spherical aberration of each wavelength. If the condition (7a) is satisfied, it is possible to more easily reduce sensitivity of decentering coma caused by a relative positional error of the first lens unit B1.

If the condition (8a) is satisfied, it is possible to more easily suppress a zoom variation of curvature of field caused by a high zoom ratio. More usefully, the numerical ranges of the conditions (4a) to (9a) are set as follows:

$$1.3 < |f2n1|/fw < 1.5 \quad (4b)$$

$$-1.5 < SF1p < -1.2 \quad (5b)$$

$$0.90 < |f1n1|/f1p1 < 1.30 \quad (6b)$$

$$1.35 < f1/\sqrt{(fw \times ft)} < 1.55 \quad (7b)$$

$$0.42 < DSP/TDw < 0.45 \quad (8b)$$

$$0.9 < |m2|/\sqrt{(fw \times ft)} < 1.1 \quad (9b)$$

As described above, according to each exemplary embodiment of the invention, it is possible to obtain a zoom lens having high image-forming performance with a high zoom ratio by appropriately setting a configuration of each lens unit and a zooming contribution caused by power arrangement.

The image pickup apparatus having the zoom lens according to exemplary embodiments of the invention may be provided with a circuit (correction circuit) for electrically correcting distortion and/or chromatic aberration of magnification and the like of an image generated by the zoom lens. As a result, since it is possible to allow for distortion and the like generated by the zoom lens, it is possible to reduce the number of lenses of the zoom lens and easily miniaturize the entire zoom lens. In addition, if chromatic aberration of magnification can be electrically corrected, it is possible to reduce color bleeding of a photographed image and easily improve resolution. In addition, it is desirable to provide at least an aspheric surface in the third lens unit B3.

It is desirable to provide an aspheric surface in order to reduce the F-number at the wide-angle end and allow the subsequent lens units to have a simple lens configuration. In the first to fourth exemplary embodiments, since at least one of the lens surfaces of the positive lens of the third lens unit B3 has an aspheric shape, it is possible to easily suppress aberration generated by the positive lens to be lower. Thus, since the aspheric surface generates aberration inverse to the aberration generated by a reference spherical surface of the positive lens, it is possible to obtain a balance between the aberration caused by the reference spherical surface and the aberration caused by the aspheric surface.

In particular, it is possible to easily and appropriately correct spherical aberration, coma, and the like at the wide-angle end while a predetermined brightness is obtained.

In the zoom lens of each exemplary embodiment, a wide angle of view is easily obtained by increasing the refractive powers of the first and second lens units B1 and B2 to satisfy the conditions (2) and (7). In addition, the following condition (10) is satisfied:

$$0.50 < D1SP/TDw < 0.62 \quad (10),$$

where D1Sp denotes a distance to the aperture stop SP from the lens surface on the object side of the first lens unit B1.

In this manner, the front lens effective diameter can be easily reduced by decreasing the distance D1Sp. As a result, it is possible to reduce the lens diameter of the first lens unit B1. In addition, the following condition (11) is satisfied:

$$4.80 < f3/fw < 6.30 \quad (11),$$

where f3 denotes a focal length of the third lens unit B3. In this manner, a distance from the aperture stop SP to the image plane IP can be reduced by increasing the refractive power of the third lens unit B3 to a certain level. As a result, it is possible to reduce the entire lens length.

Hereinafter, specific numerical data of Numerical Examples 1 to 4 corresponding to the first to fourth exemplary embodiments of the invention will be described. In each numerical example, i denotes a surface number counted from the object side, ri denotes a radius of curvature of the i-th optical surface (i-th surface), di denotes an axial distance between the i-th surface and the (i+1)th surface, and ndi and vdi denote a refractive index and an Abbe number, respectively, of a material of the i-th optical member for d-line. Two surfaces closest to the image side correspond to a glass block G. An aspheric shape can be expressed as follows:

$$X = \frac{\frac{H^2}{R}}{1+\sqrt{1-(1+K)\left(\frac{H}{R}\right)^2}} + A4H^4 + A5H^5 + A6H^6 + A7H^7 + A8H^8 + A9H^9 + A10H^{10}$$

where X-axis denotes the optical axis direction, the H-axis denotes a direction perpendicular to the optical axis direction, the light propagation direction is set to be positive, R denotes a paraxial radius of curvature, K denotes a conic constant, and A4, A5, A6, A7, A8, A9, and A10 denote aspheric coefficients.

Here, the asterisk* denotes a surface having an aspheric shape. "e-x" means "$10^{-x}$." BF denotes a back focus represented by an air-equivalent length. In addition, a relationship between the conditions and the numerical examples described above is represented in Table 1.

In Table 1, fi denotes a focal length of the i-th lens unit. In each numerical example, values such as an F-number, an angle of view, an image height, the entire lens length, BF are represented for four focal lengths at the wide-angle end, the first middle zoom position, the second middle zoom position, and the telephoto end.

Numerical Example 1 unit mm

Surface data

| Surface number | r | d | nd | vd | θgF |
|---|---|---|---|---|---|
| 1 | 45.688 | 1.20 | 2.00100 | 29.1 | 0.5997 |
| 2 | 28.337 | 6.32 | 1.49700 | 81.5 | 0.5374 |
| 3 | 261.194 | 0.15 | | | |
| 4 | 29.732 | 4.21 | 1.49700 | 81.5 | 0.5374 |
| 5 | 160.454 | 0.15 | | | |
| 6 | 28.300 | 2.47 | 1.62299 | 58.2 | 0.5458 |
| 7 | 63.611 | Variable | | | |
| 8 | 32.706 | 0.50 | 2.00100 | 29.1 | 0.5997 |
| 9 | 5.453 | 3.00 | | | |
| 10 | −23.309 | 0.50 | 2.00100 | 29.1 | 0.5997 |
| 11 | 24.249 | 0.15 | | | |
| 12 | 12.280 | 2.26 | 1.92286 | 18.9 | 0.6495 |
| 13 | −14.890 | 0.50 | 1.88300 | 40.8 | 0.5667 |
| 14 | 71.077 | Variable | | | |
| 15 (Stop) | ∞ | 1.40 | | | |
| 16* | 10.517 | 4.90 | 1.69350 | 53.2 | 0.5464 |
| 17* | −30.407 | 0.15 | | | |
| 18 | 24.415 | 0.70 | 2.00100 | 29.1 | 0.5997 |
| 19 | 9.792 | Variable | | | |
| 20* | 16.627 | 3.25 | 1.55332 | 71.7 | 0.5402 |

-continued unit mm

| 21 | −12.131 | 0.50 | 1.94595 | 18.0 | 0.6544 |
|---|---|---|---|---|---|
| 22 | −17.148 | Variable | | | |
| 23 | ∞ | 3.00 | 1.51633 | 64.1 | 0.5352 |
| 24 | ∞ | 1.00 | | | |
| Image plane | ∞ | | | | |

Aspheric data

16th surface

K = −9.95646e−001    A4 = 1.34143e−005    A6 = 2.06063e−007
A8 = 8.17179e−010    A10 = −1.21846e−012

17th surface

K = −1.08223e+001    A4 = 6.08106e−005    A6 = −1.26736e−007

20th surface

K = 1.39372e+000    A4 = −7.59345e−005    A6 = −6.22784e−007

Various data
zoom ratio 30.56

| Focal length | 4.52 | 59.42 | 88.05 | 138.07 |
|---|---|---|---|---|
| F-number | 1.44 | 4.46 | 4.70 | 4.80 |
| Angle of view | 33.59 | 2.89 | 1.95 | 1.24 |
| Image height | 3.00 | 3.00 | 3.00 | 3.00 |
| Entire lens length | 83.03 | 83.03 | 83.03 | 83.03 |
| BF | 13.46 | 18.47 | 12.62 | 4.87 |
| d7 | 0.60 | 22.08 | 23.75 | 24.47 |
| d14 | 25.37 | 3.89 | 2.22 | 1.50 |
| d19 | 11.30 | 6.29 | 12.14 | 19.89 |
| d22 | 10.48 | 15.49 | 9.64 | 1.89 |

Zoom lens unit data

| Unit | Starting surface | Focal length |
|---|---|---|
| 1 | 1 | 36.29 |
| 2 | 8 | −5.64 |
| 3 | 15 | 25.12 |
| 4 | 20 | 18.37 |
| 5 | 23 | ∞ |

Numerical Example 2 unit mm

Surface data

| Surface number | r | d | nd | vd | θgF |
|---|---|---|---|---|---|
| 1 | 58.638 | 0.60 | 2.00100 | 29.1 | 0.5997 |
| 2 | 28.616 | 4.97 | 1.59522 | 67.7 | 0.5442 |
| 3 | 168.873 | 0.10 | | | |
| 4 | 31.611 | 4.04 | 1.60311 | 60.6 | 0.5414 |
| 5 | 254.517 | 0.10 | | | |
| 6 | 30.512 | 1.78 | 1.72916 | 54.7 | 0.5444 |
| 7 | 51.697 | Variable | | | |
| 8 | 28.089 | 0.50 | 2.00330 | 28.3 | 0.5980 |
| 9 | 5.482 | 3.37 | | | |
| 10 | −38.110 | 0.45 | 1.91082 | 35.3 | 0.5824 |
| 11 | 19.346 | 0.15 | | | |
| 12 | 10.522 | 2.02 | 1.95906 | 17.5 | 0.6599 |
| 13 | −54.523 | 0.01 | | | |
| 14 | −54.397 | 0.45 | 1.88300 | 40.8 | 0.5667 |
| 15 | 24.721 | Variable | | | |
| 16 (Stop) | ∞ | 1.5 | | | |
| 17* | 13.673 | 4.34 | 1.69350 | 53.2 | 0.5464 |
| 18* | −29.253 | 0.15 | | | |
| 19 | 19.793 | 2.27 | 1.64769 | 33.8 | 0.5939 |
| 20 | −1062.997 | 0.50 | 2.00069 | 25.5 | 0.6133 |

-continued unit mm

| | | | | |
|---|---|---|---|---|
| 21 | 11.895 | Variable | | |
| 22* | 20.362 | 3.30 | 1.58313 | 59.4 | 0.5423 |
| 23 | −11.260 | 0.50 | 1.84666 | 23.8 | 0.6205 |
| 24 | −17.899 | Variable | | |
| 25 | ∞ | 3.00 | 1.51633 | 64.1 | 0.5352 |
| 26 | ∞ | 1 | | |
| Image plane | ∞ | | | |

Aspheric data

17th surface

K = −9.58767e−001    A4 = −1.07235e−005    A5 = 7.10447e−007
A6 = −8.16348e−009   A7 = 4.30432e−009     A8 = 1.82578e−010
A9 = 3.05609e−011

18th surface

K = −1.14281e+001    A4 = −9.28796e−006    A5 = 1.99793e−006

22th surface

K = −4.89989e+000    A4 = 4.33459e−005     A6 = −3.18277e−007

Various data
zoom ratio 32.74

| | | | | |
|---|---|---|---|---|
| Focal length | 4.58 | 34.85 | 65.14 | 149.95 |
| F-number | 1.60 | 4.64 | 5.20 | 5.60 |
| Angle of view | 33.22 | 4.92 | 2.64 | 1.15 |
| Image height | 3.00 | 3.00 | 3.00 | 3.00 |
| Entire lens length | 86.33 | 86.33 | 86.33 | 86.33 |
| BF | 13.18 | 22.67 | 20.73 | 5.38 |
| d7 | 0.50 | 21.03 | 24.82 | 27.52 |
| d15 | 28.52 | 7.98 | 4.20 | 1.50 |
| d21 | 13.02 | 3.53 | 5.46 | 20.82 |
| d24 | 10.20 | 19.69 | 17.76 | 2.40 |

Zoom lens unit data

| Unit | Starting surface | Focal length |
|---|---|---|
| 1 | 1 | 38.74 |
| 2 | 8 | −5.92 |
| 3 | 16 | 24.65 |
| 4 | 22 | 19.60 |
| 5 | 25 | ∞ |

Numerical Example 3 unit mm

Surface data

| Surface number | r | d | nd | νd | θgF |
|---|---|---|---|---|---|
| 1 | 45.340 | 1.25 | 2.00069 | 25.5 | 0.6133 |
| 2 | 30.070 | 5.85 | 1.49700 | 81.5 | 0.5374 |
| 3 | 176.956 | 0.15 | | | |
| 4 | 31.963 | 4.42 | 1.59522 | 67.7 | 0.5442 |
| 5 | 197.840 | 0.10 | | | |
| 6 | 26.575 | 2.12 | 1.59522 | 67.7 | 0.5442 |
| 7 | 43.716 | Variable | | | |
| 8 | 49.443 | 0.45 | 2.00100 | 29.1 | 0.5997 |
| 9 | 5.843 | 3.17 | | | |
| 10 | −18.179 | 0.40 | 1.91082 | 35.3 | 0.5824 |
| 11 | 43.885 | 0.12 | | | |
| 12 | 13.400 | 2.42 | 1.95906 | 17.5 | 0.6599 |
| 13 | −21.705 | 0.40 | 1.91082 | 35.3 | 0.5824 |
| 14 | 46.734 | Variable | | | |
| 15 (Stop) | ∞ | 1.00 | | | |
| 16* | 10.759 | 4.79 | 1.69350 | 53.2 | 0.5464 |
| 17* | −37.365 | 0.10 | | | |

-continued unit mm

| | | | | | |
|---|---|---|---|---|---|
| 18 | 28.102 | 0.55 | 2.00100 | 29.1 | 0.5997 |
| 19 | 10.770 | Variable | | | |
| 20* | 16.499 | 3.98 | 1.55332 | 71.7 | 0.5402 |
| 21 | −12.410 | 0.50 | 1.94595 | 18.0 | 0.6544 |
| 22 | −17.197 | Variable | | | |
| 23 | ∞ | 3.00 | 1.51633 | 64.1 | 0.5352 |
| 24 | ∞ | 1.00 | | | |
| Image plane | ∞ | | | | |

Aspheric data

16th surface

K = −1.03526e+000    A5 = 8.04291e−007    A7 = 5.49169e−008
A9 = −7.95157e−010   A11 = 1.59096e−012

17th surface

K = −1.56411e+001    A5 = 5.68090e−006    A7 = −5.19224e−008

20th surface

K = 4.09148e−002     A4 = −6.34315e−005   A6 = −1.71996e−007
A8 = −2.89251e−010

Various data
zoom ratio 29.51

| | | | | |
|---|---|---|---|---|
| Focal length | 4.49 | 43.47 | 89.44 | 132.47 |
| F-number | 1.44 | 2.74 | 3.45 | 4.60 |
| Angle of view | 33.76 | 3.95 | 1.92 | 1.30 |
| Image height | 3.00 | 3.00 | 3.00 | 3.00 |
| Entire lens length | 84.70 | 84.70 | 84.70 | 84.70 |
| BF | 14.18 | 21.61 | 13.57 | 6.82 |
| d7 | 0.60 | 20.77 | 24.46 | 25.20 |
| d14 | 26.40 | 6.23 | 2.54 | 1.80 |
| d19 | 11.75 | 4.31 | 12.35 | 19.10 |
| d22 | 11.20 | 18.64 | 10.59 | 3.84 |

Zoom lens unit data

| Unit | Starting surface | Focal length |
|---|---|---|
| 1 | 1 | 37.44 |
| 2 | 8 | −5.71 |
| 3 | 15 | 27.79 |
| 4 | 20 | 18.24 |
| 5 | 23 | ∞ |

Numerical Example 4 unit mm

Surface data

| Surface number | r | d | nd | νd | θgF |
|---|---|---|---|---|---|
| 1 | 50.481 | 1.20 | 2.00069 | 25.5 | 0.6133 |
| 2 | 31.972 | 5.23 | 1.49700 | 81.5 | 0.5374 |
| 3 | 187.248 | 0.15 | | | |
| 4 | 37.076 | 3.56 | 1.59522 | 67.7 | 0.5442 |
| 5 | 168.553 | 0.10 | | | |
| 6 | 25.151 | 3.26 | 1.59522 | 67.7 | 0.5442 |
| 7 | 62.156 | Variable | | | |
| 8 | 45.423 | 0.45 | 2.00100 | 29.1 | 0.5997 |
| 9 | 5.690 | 2.92 | | | |
| 10 | −33.605 | 0.40 | 2.00100 | 29.1 | 0.5997 |
| 11 | 18.249 | 0.20 | | | |
| 12 | 11.478 | 2.48 | 1.95906 | 17.5 | 0.6599 |
| 13 | −21.679 | 0.4 | 1.91082 | 35.3 | 0.5824 |
| 14 | 42.431 | Variable | | | |
| 15 (Stop) | ∞ | Variable | | | |
| 16* | 12.050 | 3.62 | 1.58313 | 59.4 | 0.5423 |

-continued unit mm

| | | | | | |
|---|---|---|---|---|---|
| 17* | −33.774 | 0.10 | | | |
| 18 | 19.082 | 0.55 | 2.00100 | 29.1 | 0.5997 |
| 19 | 11.564 | Variable | | | |
| 20* | 21.116 | 3.27 | 1.55332 | 71.7 | 0.5402 |
| 21 | −11.709 | 0.50 | 1.94595 | 18.0 | 0.6544 |
| 22 | −15.977 | Variable | | | |
| 23 | ∞ | 3.00 | 1.51633 | 64.1 | 0.5352 |
| 24 | ∞ | 1.00 | | | |
| Image plane | ∞ | | | | |

Aspheric data

16th surface

K = −1.72748e+000　　A5 = 1.08075e−005　　A7 = 7.61553e−009
A9 = −2.16187e−010

17th surface

K = 2.43903e−001　　A5 = 1.49463e−005　　A7 = −6.14761e−008

20th surface

K = −1.07912e+001　　A4 = 8.59818e−005　　A6 = −7.48089e−007

Various data
zoom ratio 32.97

| | | | | |
|---|---|---|---|---|
| Focal length | 4.43 | 45.28 | 63.65 | 146.17 |
| F-number | 1.65 | 4.19 | 4.46 | 5.18 |
| Angle of view | 34.09 | 3.79 | 2.70 | 1.18 |
| Image height | 3.00 | 3.00 | 3.00 | 3.00 |
| Entire lens length | 83.46 | 83.46 | 83.46 | 83.46 |
| BF | 15.53 | 23.87 | 21.38 | 6.12 |
| d7 | 0.60 | 20.11 | 22.01 | 24.39 |
| d14 | 25.09 | 5.58 | 3.68 | 1.30 |
| d15 | 1.50 | 0.93 | 0.87 | 0.80 |
| d19 | 12.35 | 4.59 | 7.13 | 22.47 |
| d22 | 12.55 | 20.89 | 18.40 | 3.14 |

Zoom lens unit data

| Unit | Starting surface | Focal length |
|---|---|---|
| 1 | 1 | 35.91 |
| 2 | 8 | −5.47 |
| 3 | 15 | ∞ |
| 4 | 16 | 27.58 |
| 5 | 20 | 19.78 |
| 6 | 23 | ∞ |

TABLE 1

| Values of conditions corresponding to each embodiment | Numerical Example | | | |
|---|---|---|---|---|
| | 1 | 2 | 3 | 4 |
| fw | 4.517 | 4.580 | 4.488 | 4.433 |
| ft | 138.071 | 149.947 | 132.472 | 146.167 |
| f1 | 36.289 | 38.737 | 37.443 | 35.913 |
| f2 | −5.645 | −5.917 | −5.712 | −5.475 |
| f3 | 25.119 | 24.647 | 27.785 | 27.583 |
| f4 | 18.367 | 19.599 | 18.238 | 19.784 |
| m2 | 23.867 | 27.017 | 24.600 | 23.794 |
| vd11 | 81.5 | 67.7 | 81.5 | 81.5 |
| θgF11 | 0.5374 | 0.544 | 0.5374 | 0.5374 |
| vd12 | 81.5 | 60.6 | 67.7 | 67.7 |
| θgF12 | 0.5374 | 0.541 | 0.544 | 0.544 |
| vd13 | 58.16 | 54.7 | 67.7 | 67.7 |
| θgF13 | 0.5458 | 0.544 | 0.544 | 0.544 |
| f1n1 | −77.212 | −56.400 | −93.037 | −90.059 |
| f1p1 | 63.383 | 57.130 | 71.939 | 76.719 |
| f2n1 | −6.598 | −6.866 | −6.654 | −6.535 |
| DSP | 35.656 | 38.765 | 36.846 | 37.427 |
| TDw | 83.032 | 86.333 | 84.696 | 83.460 |

TABLE 1-continued

| Values of conditions corresponding to each embodiment | Numerical Example | | | |
|---|---|---|---|---|
| | 1 | 2 | 3 | 4 |
| ft/fw | 30.564 | 32.738 | 29.514 | 32.972 |
| D1Sp | 47.38 | 47.56 | 47.85 | 46.04 |
| (1) θgF1i + 0.001618 × | 0.611 | 0.595 | 0.611 | 0.611 |
| (vd1i − 36.23) | 0.611 | 0.581 | 0.595 | 0.595 |
| | 0.581 | 0.574 | 0.595 | 0.595 |
| (2) √(\|f2\| × m2)/ft | 0.084 | 0.084 | 0.089 | 0.078 |
| (3) n2na | 1.944 | 1.917 | 1.941 | 1.971 |
| (4) \|f2n1\|/fw | 1.461 | 1.499 | 1.482 | 1.474 |
| (5) SF1p | −1.243 | −1.408 | −1.409 | −1.412 |
| (6) \|f1n1\|/f1p1 | 1.218 | 0.987 | 1.293 | 1.174 |
| (7) f1/√(fw × ft) | 1.453 | 1.478 | 1.536 | 1.411 |
| (8) DSP/TDw | 0.429 | 0.449 | 0.435 | 0.448 |
| (9) \|m2\|/√(fw × ft) | 0.956 | 1.031 | 1.009 | 0.935 |
| (10) D1Sp/TDw | 0.57 | 0.55 | 0.56 | 0.55 |
| (11) f3/fw | 5.56 | 5.38 | 6.19 | 6.22 |

Next, a digital video camera in which the zoom lens according to an exemplary embodiment of the invention is used as the photographic optical system will be described with reference to FIG. 9.

In FIG. 9, reference numeral 10 denotes a camera body, and reference numeral 11 denotes a photographic optical system having any one of the zoom lenses described in the first to fourth exemplary embodiments of the invention. Reference numeral 12 denotes a solid-state image sensor (photoelectric conversion element) such as a CCD sensor or a CMOS sensor mounted in the camera body 10 to receive an object image formed by the photographic optical system 11.

A network camera in which the zoom lens according to an exemplary embodiment of invention is used as the photographic optical system will be described with reference to FIG. 10.

In FIG. 10, reference numeral 20 denotes a camera body, and reference numeral 21 denotes a photographic optical system having the zoom lens described in any one of the first to fourth exemplary embodiments of the invention. Reference numeral 22 denotes a solid-state image sensor (photoelectric conversion element) such as a CCD sensor or a CMOS sensor mounted in the camera body 20 to receive an object image formed by the photographic optical system 21. In this manner, it is possible to implement an image pickup apparatus having high optical performance with a small size by applying the zoom lens according to the present invention to the image pickup apparatus such as a digital video camera or a network camera. However, the zoom lens of each exemplary embodiment may be used in a projection optical system for a projector.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-187165 filed Aug. 30, 2011, which is hereby incorporated by reference herein in its entirety.

What is claimed is:

1. A zoom lens comprising, in order from an object side to an image side, a first lens unit of a positive refractive power, a second lens unit of a negative refractive power, a third lens unit of a positive refractive power, and a fourth lens unit of a positive refractive power, wherein the first lens unit does not move for zooming, at least the second and fourth lens units are moved during zooming, the first lens unit includes at least one positive lens 1i, and the following conditions are satisfied:

$0.5826 < \theta gF1i + 0.001618 \times (vd1i \times 36.23) < 0.8000$, $0.040 < \sqrt{(|f2| \times m2)/ft} < 0.095$, and $1.90 < n2na < 2.50$, where vd1i and θgF1i denote an Abbe number and a relative partial dispersion, respectively, of a material of the positive lens 1i, n2na denotes an average refractive index of materials of negative lenses included in the second lens unit, m2 denotes a movement amount of the second lens unit for zooming from a wide-angle end to a telephoto end, f2 denotes a focal length of the second lens unit, and ft denotes a focal length of the entire zoom lens at the telephoto end.

2. The zoom lens according to claim 1, wherein a negative lens is arranged in a position closest to the object side of the second lens unit, and the following condition is satisfied:

$0.4 < |f2n1|/fw < 1.8$, where f2n1 denotes a focal length of the negative lens, and fw denote a focal length of the entire zoom lens at the wide-angle end.

3. The zoom lens according to claim 1, wherein the following condition is satisfied:

$-1.8 < SF1p < -0.8$, where SF1p denotes a shape factor of a positive lens closest to the object side of the first lens unit.

4. The zoom lens according to claim 1, wherein the following condition is satisfied:

$0.8 < |f1n1|/f1p1 < 1.4$, where f1n1 denotes a focal length of a negative lens closest to the object side of the first lens unit, and f1p1 denotes a focal length of a positive lens closest to the object side of the first lens unit.

5. The zoom lens according to claim 1, wherein the following condition is satisfied:

$1.2 < f1/\sqrt{(fw \times ft)} < 1.8$, where f1 denotes a focal length of the first lens unit, and fw denotes a focal length of the entire zoom lens at the wide-angle end.

6. The zoom lens according to claim 1, further comprising an aperture stop on the object side of the third lens unit, wherein the following condition is satisfied:

$0.40 < DSP/TDw < 0.55$, where TDw denotes an entire lens length of the zoom lens at the wide-angle end, and DSP denotes an air-equivalent distance from the aperture stop to an image plane at the wide-angle end.

7. The zoom lens according to claim 1, wherein the following condition is satisfied:

$0.8 < |m2|/\sqrt{(fw \times ft)} < 1.4$ where fw denotes a focal length of the entire zoom lens at the wide-angle end.

8. The zoom lens according to claim 1, further comprising an aperture stop on the object side of the third lens unit, wherein the following condition is satisfied:

$0.50 < D1SP/TDw < 0.62$ where TDw denotes an entire lens length of the zoom lens at the wide-angle end, and D1SP denotes a distance from a lens surface on the object side of the first lens unit to the aperture stop.

9. The zoom lens according to claim 1, wherein the following condition is satisfied:

$4.80 < f3/fw < 6.00$, where f3 denotes a focal length of the third lens unit, and fw denotes a focal length of the entire zoom lens at the wide-angle end.

10. An image pickup apparatus comprising:
zoom lens comprising, in order from an object side to an image side, a first lens unit of a positive refractive power, a second lens unit of a negative refractive power, a third lens unit of a positive refractive power, and a fourth lens unit of a positive refractive power,
wherein the first lens unit does not move for zooming, at least the second and fourth lens units are moved during zooming, the first lens unit includes at least one positive lens 1i, and the following conditions are satisfied:

$0.5826 < \theta gF1i + 0.001618 \times (vd1i \times 36.23) < 0.8000$, $0.040 < \sqrt{(|f2| \times m2)/ft} < 0.095$, and $1.90 < n2na < 2.50$, where vd1i and θgF1i denote an Abbe number and a relative partial dispersion, respectively, of a material of the positive lens 1i, n2na denotes an average refractive index of materials of negative lenses included in the second lens unit, m2 denotes a movement amount of the second lens unit for zooming from a wide-angle end to a telephoto end, f2 denotes a focal length of the second lens unit, and ft denotes a focal length of the entire zoom lens at the telephoto end; and
an image sensor configured to receive an image formed by the zoom lens.

* * * * *